United States Patent
Kim et al.

(10) Patent No.: US 12,367,646 B2
(45) Date of Patent: Jul. 22, 2025

(54) AUGMENTED REALITY DEVICE AND METHOD FOR OBTAINING DEPTH MAP BY USING DEPTH SENSOR

(71) Applicant: SAMSUNG ELECTRONICS CO., LTD., Suwon-si (KR)

(72) Inventors: Jeongwon Kim, Suwon-si (KR); Sangho Yoon, Suwon-si (KR); Kyusub Kwak, Suwon-si (KR); Jaewoo Ko, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 366 days.

(21) Appl. No.: 17/967,525

(22) Filed: Oct. 17, 2022

(65) Prior Publication Data

US 2023/0077073 A1    Mar. 9, 2023

Related U.S. Application Data

(63) Continuation of application No. PCT/KR2022/013115, filed on Sep. 1, 2022.

(30) Foreign Application Priority Data

Sep. 3, 2021    (KR) .......... 10-2021-0117939

(51) Int. Cl.
    *G06T 19/00* (2011.01)
    *G01S 17/894* (2020.01)
    (Continued)

(52) U.S. Cl.
    CPC .......... *G06T 19/006* (2013.01); *G01S 17/894* (2020.01); *G02B 3/14* (2013.01);
    (Continued)

(58) Field of Classification Search
    None
    See application file for complete search history.

(56) References Cited

U.S. PATENT DOCUMENTS 9,336,440 B2    5/2016    Ramachandran et al.
9,443,350 B2    9/2016    Wagner et al.
(Continued)

FOREIGN PATENT DOCUMENTS

KR    10-2016-0142839 A    12/2016
KR    10-2016-0149068 A    12/2016
(Continued)

OTHER PUBLICATIONS

Communication dated Sep. 11, 2024, issued by the European Patent Office in European Application No. 22865067.7.
(Continued)

*Primary Examiner* — Michael J Cobb
(74) *Attorney, Agent, or Firm* — Sughrue Mion, PLLC

(57) ABSTRACT

A method of obtaining a depth map, performed by an augmented reality (AR) device including a depth sensor, includes: sensing a motion of the AR device worn by a user; identifying an activity of the user, based on the sensed motion of the AR device; determining a light pattern of emission light to be emitted by the depth sensor, based on the identified activity; controlling the depth sensor to emit emission light in the determined light pattern; receiving reflection light obtained by reflection of the emission light by at least one object; and obtaining the depth map, based on the emission light and the received reflection light.

15 Claims, 20 Drawing Sheets

(51) Int. Cl.
*G02B 3/14* (2006.01)
*G02B 27/01* (2006.01)
*G06T 7/20* (2017.01)
*G06T 7/521* (2017.01)
*G06T 7/70* (2017.01)
*G06V 10/141* (2022.01)

(52) U.S. Cl.
CPC ............ *G02B 27/0172* (2013.01); *G06T 7/20* (2013.01); *G06T 7/521* (2017.01); *G06T 7/70* (2017.01); *G06V 10/141* (2022.01); *G02B 2027/0178* (2013.01); *G06T 2207/10028* (2013.01)

(56) References Cited

U.S. PATENT DOCUMENTS

| | | |
|---|---|---|
| 10,362,296 B2 | 7/2019 | Price et al. |
| 10,592,753 B1 | 3/2020 | Ortiz Egea et al. |
| 10,605,922 B2 | 3/2020 | Deane |
| 10,818,721 B2 | 10/2020 | Dutton |
| 10,855,896 B1 * | 12/2020 | Li .................... G01S 7/4868 |
| 10,902,623 B1 * | 1/2021 | Li ...................... G06T 7/521 |
| 11,061,234 B1 | 7/2021 | Zhu et al. |
| 11,249,305 B2 | 2/2022 | Koo et al. |
| 2012/0327125 A1 | 12/2012 | Kutliroff et al. |
| 2013/0278631 A1 * | 10/2013 | Border ................ G06F 3/04842 345/633 |
| 2014/0267631 A1 | 9/2014 | Powers et al. |
| 2018/0018786 A1 | 1/2018 | Jakubiak et al. |
| 2019/0075281 A1 | 3/2019 | Hall et al. |
| 2020/0184664 A1 | 6/2020 | Rhee et al. |
| 2020/0319309 A1 | 10/2020 | Van Nieuwenhove |
| 2020/0326775 A1 | 10/2020 | Koo et al. |
| 2021/0160478 A1 | 5/2021 | Cho et al. |
| 2022/0099836 A1 * | 3/2022 | Croxford ................ G01S 7/484 |

FOREIGN PATENT DOCUMENTS

| | | |
|---|---|---|
| KR | 10-2018-0008221 A | 1/2018 |
| KR | 10-1979317 B1 | 5/2019 |
| KR | 10-2020-0069096 A | 6/2020 |
| KR | 10-2020-0071565 A | 6/2020 |
| KR | 10-2020-0120466 A | 10/2020 |
| KR | 10-2181716 B1 | 11/2020 |
| KR | 10-2021-0030230 A | 3/2021 |

OTHER PUBLICATIONS

International Search Report and Written Opinion (PCT/ISA/220, PCT/ISA/210, and PCT/ISA/237) dated Dec. 6, 2022 issued by the International Searching Authority in Internatonal Application No. PCT/KR2022/013115.

* cited by examiner

AUGMENTED REALITY DEVICE AND METHOD FOR OBTAINING DEPTH MAP BY USING DEPTH SENSOR

CROSS-REFERENCE TO RELATED APPLICATIONS

This application is a continuation application of International Application No. PCT/KR2022/013115, filed on Sep. 1, 2022, which is based on and claims priority to Korean Patent Application No. 10-2021-0117939, filed on Sep. 3, 2021, in the Korean Intellectual Property Office, the disclosures of which are incorporated by reference herein in their entireties.

BACKGROUND

1. Field

The disclosure relates to an augmented reality (AR) device and method for obtaining a depth map by controlling a depth sensor within a limited power budget.

2. Description of Related Art

With the development of technology, use of content that provides virtual reality (VR) or augmented reality (AR) is increasing. For the creation of AR content, a depth sensor that obtains a three-dimensional (3D) image is being developed.

Among electronic devices, there are electronic devices provided in a form that can be worn on the body. These electronic devices may be typically referred to as wearable devices. Head mounted electronic devices such as head mounted devices (HMDs) may be included among the types of electronic devices that can be worn on the body. Head-mounted electronic devices may be worn on a part of a user's body (e.g., a user's head) and provide a VR or AR environment to the user. The provision of an AR environment may include, for example, provision of a display capable of implementing AR and various user interfaces.

In AR technology, virtual objects or information is synthesized with a real environment so that the virtual objects or information look like objects existing in a real physical environment. Modern computing and display technologies have enabled the development of systems for AR experiences. In such AR experiences, a digitally-regenerated image or a portion thereof may be presented to users in such a way as to be perceived or thought of as being real. In order to implement a more realistic AR technology, accurate depth information with respect to a field of view (FOV) area of a user as well as an image of a real environment is required.

As interest in AR technology increases, various technologies for implementing AR are being actively developed. Among these technologies, light-weight, head-mounted electronic devices have a limited battery capacity. Accordingly, there is a demand for a technology capable of generating an accurate depth map for the entire FoV area while reducing the amount of power consumed by a depth sensor.

SUMMARY

Provided are an AR device and a method capable of reducing the amount of power consumed by a time of flight (ToF) type depth sensor by identifying an activity of a user wearing the AR device and determining a light pattern of emission light emitted by the ToF type depth sensor, based on the identified activity.

Additional aspects will be set forth in part in the description which follows and, in part, will be apparent from the description, or may be learned by practice of the presented embodiments.

According to an aspect of the disclosure, a method of obtaining a depth map, performed by an augmented reality (AR) device including a depth sensor, includes: sensing a motion of the AR device worn by a user; identifying an activity of the user, based on the sensed motion of the AR device; determining a light pattern of emission light to be emitted by the depth sensor, based on the identified activity; controlling the depth sensor to emit emission light in the determined light pattern; receiving reflection light obtained by reflection of the emission light by at least one object; and obtaining the depth map, based on the emission light and the received reflection light.

According to an aspect of the disclosure, an augmented reality (AR) device includes: a motion sensor configured to sense a motion of the AR device worn by a user; a depth sensor including a light emission unit and a light detection unit; a storage storing at least one instruction; and at least one processor configured to execute the at least one instruction to: identify an activity of the user, based on the motion of the AR device sensed by the motion sensor, determine a light pattern of emission light to be emitted by the depth sensor, based on the identified activity, control the light emission unit to emit the emission light in the determined light pattern, receive, through the light detection unit, reflection light obtained by reflection of the emission light by at least one object, and obtain a depth map, based on the emission light and the received reflection light.

According to an aspect of the disclosure, a non-transitory computer-readable recording medium has recorded thereon a computer program, which, when executed by a computer, performs the method.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
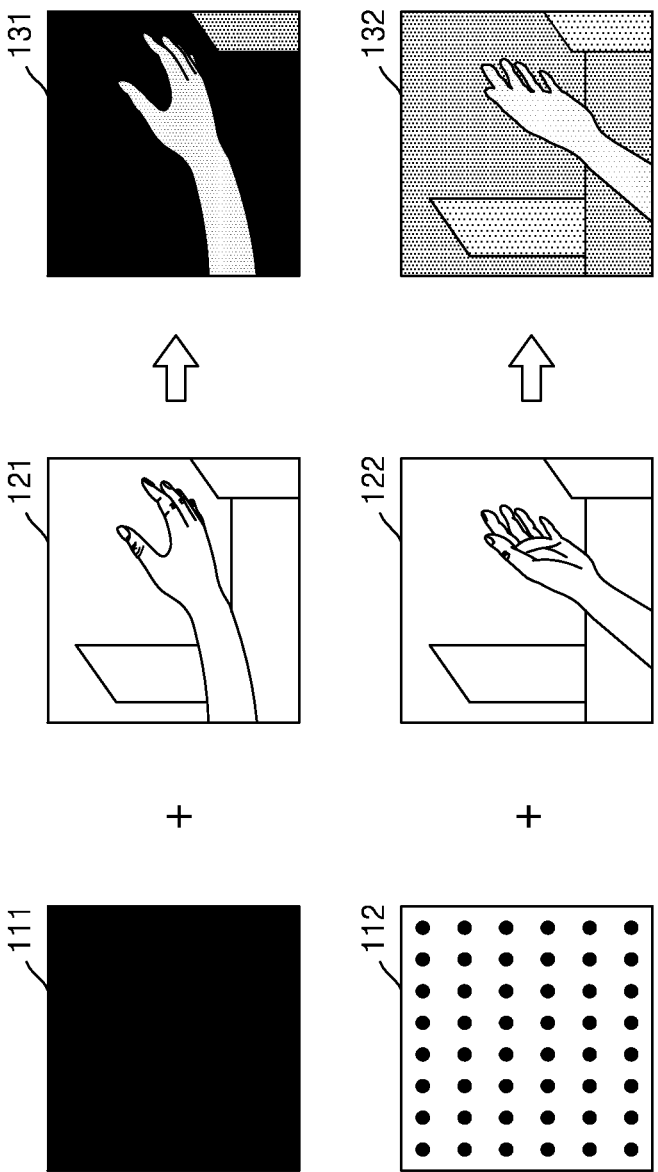
FIG. 1 is a schematic view of a method, performed by an augmented reality (AR) device according to an embodiment of the disclosure, of obtaining a depth map by using a depth sensor.

According to an aspect of the disclosure, a method of obtaining a depth map, performed by an augmented reality (AR) device including a depth sensor, includes: sensing a motion of the AR device worn by a user; identifying an activity of the user, based on the sensed motion of the AR device; determining a light pattern of emission light to be emitted by the depth sensor, based on the identified activity; controlling the depth sensor to emit emission light in the determined light pattern; receiving reflection light obtained by reflection of the emission light by at least one object; and obtaining the depth map, based on the emission light and the received reflection light.

The depth sensor may include at least one emitter, and the controlling the depth sensor to emit the emission light in the determined light pattern may include controlling an operation of the at least one emitter.

The depth sensor may include a plurality of light source modules configured to emit emission light in different light patterns, and the controlling the depth sensor to emit the emission light in the determined light pattern may include individually controlling respective on and off states of each light source module of the plurality of light source modules.

The controlling the depth sensor to emit the emission light in the determined light pattern further may include: selecting a light source module corresponding to the determined light pattern from among the plurality of light source modules; setting the selected light source module to the on state; and setting at least one light source module other than the selected light source module, from among the plurality of light source modules, to the off state.

The depth sensor may include a varifocal lens and a light emission unit configured to emit the emission light through the varifocal lens to an area in front of the AR device, and the controlling the depth sensor to emit the emission light in the determined light pattern may include controlling the varifocal lens.

The light emission unit may include a plurality of emitters arranged in a grid array, and the controlling the depth sensor to emit the emission light in the determined light pattern further may include controlling an operation of the plurality of emitters.

The varifocal lens may include an upper electrode, and the controlling the depth sensor to emit the emission light in the determined light pattern may include controlling whether a voltage is applied and the upper electrode and an intensity of the voltage the upper electrode.

The depth sensor may include a light emission unit, and a liquid crystal mirror (LCM) configured to control a direction of light emitted by the light emission unit, the emission light emitted by the depth sensor is emitted by the light emission unit, reflected by the LCM, and emitted toward an area in front of the AR device, and the controlling the depth sensor to emit the emission light in the determined light pattern may include controlling the LCM.

The method may further include: determining an intensity of the emission light to be emitted by the depth sensor, based on the identified activity; and controlling the depth sensor to emit the emission light with the determined intensity.

The method may further include: determining a sensing frame rate of the depth sensor, based on the identified activity; and controlling the depth sensor to emit the emission light at the determined sensing frame rate.

The method may further include: sensing surrounding environment information of the AR device worn by the user; identifying a location of the AR device, based on the surrounding environment information of the AR device; adjusting the light pattern of the emission light to be emitted by the depth sensor, based on the location of the AR device; and controlling the depth sensor to emit the emission light with the adjusted light pattern.

The method may further include: obtaining an image of an area in front of the AR device through an image sensor; and compensating the depth map, based on the image.

According to an aspect of the disclosure, an augmented reality (AR) device includes: a motion sensor configured to sense a motion of the AR device worn by a user; a depth sensor including a light emission unit and a light detection unit; a storage storing at least one instruction; and at least one processor configured to execute the at least one instruction to: identify an activity of the user, based on the motion of the AR device sensed by the motion sensor, determine a light pattern of emission light to be emitted by the depth sensor, based on the identified activity, control the light emission unit to emit the emission light in the determined light pattern, receive, through the light detection unit, reflection light obtained by reflection of the emission light by at least one object, and obtain a depth map, based on the emission light and the received reflection light.

The light emission unit may include at least one emitter, and the processor may be further configured to execute the one or more instructions to control an operation of the at least one emitter.

The light emission unit may include a plurality of light source modules configured to emit emission light in different light patterns, and the at least one processor may be further configured to execute the at least one instruction to individually control respective on and off states of each light source module of the plurality of light source modules.

The at least one processor may be further configured to execute the at least one instruction to: select a light source module corresponding to the determined light pattern from among the plurality of light source modules, set the selected light source module to the on state, and set at least one light source module other than the selected light source module, from among the plurality of light source modules, to the off state.

The depth sensor may further include a varifocal lens, the emission light emitted by the depth sensor is emitted from the light emission unit to an area in front of the AR device through the varifocal lens, and the at least one processor may be further configured to execute at least one instruction to control the varifocal lens.

The light emission unit may include a plurality of emitters arranged in a grid array, and the at least one processor may be further configured to execute the at least one instruction to control an operation of the plurality of emitters.

The varifocal lens may include an upper electrode, and the at least one processor may be further configured to execute the at least one instruction to control the light pattern of the emission light by controlling whether a voltage is applied to the upper electrode and an intensity of the voltage applied to the upper electrode.

The depth sensor may further include a liquid crystal mirror (LCM) configured to control a direction of light emitted by the light emission unit, the emission light emitted by the depth sensor is emitted by the light emission unit, reflected by the LCM, and emitted toward an area in front of the AR device, and the at least one processor may be further configured to execute the at least one instruction to control the LCM.

The at least one processor may be further configured to execute the at least one instruction to: determine an intensity of the emission light to be emitted by the depth sensor and a sensing frame rate of the depth sensor, based on the identified activity, and control the depth sensor to emit the emission light at the determined intensity and the determined sensing frame rate.

The AR device may further include a sensor configured to obtain surrounding environment information of the AR device, and the at least one processor may be further configured to execute the at least one instruction to: identify a location of the AR device, based on the surrounding environment information of the AR device obtained by the sensor, adjust the light pattern of the emission light to be emitted by the depth sensor, based on the identified location, and control the depth sensor to emit the emission light with the adjusted light pattern.

The AR device may further include an image sensor configured to obtain an image of an area in front of the AR device, and the at least one processor may be further configured to execute the at least one instruction to compensate the depth map, based on the image obtained by the image sensor.

According to an aspect of the disclosure, a non-transitory computer-readable recording medium has recorded thereon a computer program, which, when executed by a computer, performs the method.

Throughout the disclosure, the expression "at least one of a, b or c" indicates only a, only b, only c, both a and b, both a and c, both b and c, or all of a, b, and c.

Embodiments of the disclosure will now be described more fully with reference to the accompanying drawings such that one of ordinary skill in the art to which the disclosure pertains may easily execute the disclosure. The disclosure may, however, be embodied in many different forms and should not be construed as being limited to the embodiments set forth herein. In the drawings, parts irrelevant to the description are omitted for the simplicity of explanation, and like numbers refer to like elements throughout.

Although general terms widely used at present were selected for describing the disclosure in consideration of the functions thereof, these general terms may vary according to intentions of one of ordinary skill in the art, case precedents, the advent of new technologies, or the like. Terms arbitrarily selected by the applicant of the disclosure may also be used in a specific case. In this case, their meanings need to be given in the detailed description of an embodiment of the disclosure. Hence, the terms must be defined based on their meanings and the contents of the entire specification, not by simply stating the terms.

An expression used in the singular may encompass the expression of the plural, unless it has a clearly different meaning in the context. Unless otherwise defined, all terms (including technical and scientific terms) used herein have the same meaning as commonly understood by one of ordinary skill in the art to which this disclosure belongs.

The terms "comprises" and/or "comprising" or "includes" and/or "including" used herein specify the presence of stated elements, but do not preclude the presence or addition of one or more other elements. The terms "unit", " . . . oder", and "module" used herein refers to a unit in which at least one function or operation is performed, and may be implemented as hardware, software, or a combination of hardware and software.

Throughout the specification, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements.

The expression "configured to (or set to)" used herein may be used interchangeably with, for example, "suitable for", "having the capacity to", "designed to", "adapted to", "made to", or "capable of", according to situations. The expression "configured to (or set to)" may not only necessarily refer to "specifically designed to" in terms of hardware. Instead, in some situations, the expression "system configured to" may refer to a situation in which the system is "capable of" together with another device or component parts. For example, the phrase "a processor configured (or set) to perform A, B, and C" may refer to a dedicated processor (such as an embedded processor) for performing a corresponding operation, or a generic-purpose processor (such as a central processing unit (CPU) or an application processor (AP)) that can perform a corresponding operation by executing one or more software programs stored in a memory.

The disclosure will now be described more fully with reference to the accompanying drawings.

FIG. 1 is a schematic view of a method, performed by an augmented reality (AR) device according to an embodiment of the disclosure, of obtaining a depth map by using a depth sensor.

The AR device according to an embodiment of the disclosure may correspond to an AR apparatus. The AR device, which is a device capable of expressing AR, may display an image including a physical object existing in reality and a virtual object.

The AR device may include, for example, AR glasses in the form of glasses worn by a user on his or her face, a head mounted display (HMD) worn on his or her head, a virtual reality headset (VRH), or an AR helmet. The AR device according to an embodiment of the disclosure is not limited to the above-described examples, and may include various types of devices that provide a virtual reality (VR) service or an AR service to a user or obtain a depth map through a depth sensor.

Depth sensing and depth information provision by an electronic device that provides an AR service correspond to one of major functions. According to an embodiment of the disclosure, the AR device may include a depth sensor for obtaining a three-dimensional (3D) image or depth information. The depth sensor may obtain a 3D image for a real physical object. The 3D image includes depth information of each pixel included in an image. The depth sensor (or a 3D depth camera) is a type of computational camera, and may generate an image including depth information by reprocessing images coming from subjects through a lens through computation. The depth sensor may be used in indoor mapping, AR realization, development of autonomous driving devices, and the like.

The AR device according to an embodiment of the disclosure may include a time-of-flight (ToF) type depth sensor. The ToF type depth sensor may emit modulated emission light to a scene (a front area or the field of view (FoV) of the depth sensor) for which a depth map is to be obtained, and may detect reflection light reflected by surfaces of objects included in the scene. The ToF-type depth sensor may measure a phase difference between the emitted emission light and the received reflection light to calculate a physical distance between the depth sensor and each the objects (surfaces) included in the scene. The ToF-type depth sensor includes a light emission unit for emitting emission light to the scene (front area) for which a depth map is to be obtained, and a light detection unit for detecting the reflection light reflected by the surfaces of the objects. The depth sensor according to an embodiment of the disclosure will be described in more detail later with reference to FIG. 4.

In the AR device according to an embodiment of the disclosure, a proportion of power consumed by the light emission unit and the light detection unit of the depth sensor among total power consumption is high. However, in the AR device, a battery capacity is limited. Accordingly, to effectively perform depth sensing within a limited power budget, the AR device according to an embodiment of the disclosure may control a depth sensor having high power consumption by using a movement and surrounding environment information of the AR device capable of being detected with a relatively low power and at a high speed. In more detail, in the AR device according to an embodiment of the disclosure, a motion of a user wearing the AR device or ambient illuminance information of the AR device is sensed, and a pattern of emission light emitted by the depth sensor is adjusted based on sensed information or a period (frame rate) in which the emission light is emitted is adjusted, leading to a reduction of the total power consumption of the AR device.

Referring to FIG. 1, according to an embodiment of the disclosure, the AR device may emit emission light having a first pattern 111 to a front area. The pattern of the emission light may be defined by an area irradiated by light for depth sensing within the front area. For example, a light pattern may indicate a region irradiated by the emission light emitted by the light emission unit of the depth sensor on a clipping plane located at a specific distance from the AR device.

When the depth sensor emits the emission light having the first pattern 111 to the front area, the emission light may be reflected by at least one physical object located in the front area to generate a reflection light of which phase has been changed. The generated reflection light may be sensed through the light detection unit of the depth sensor. The reflection light has the same pattern as the emission light. In other words, the reflection light sensed through the light detection unit has the first pattern 111 in correspondence with the emission light emitted to have the first pattern 111. Each pixel of the ToF type depth sensor measures a delay of a received signal with respect to a transmitted signal. Accordingly, according to an embodiment of the disclosure, the depth sensor emitting the emission light having the first pattern 111 may obtain only depth information of pixels corresponding to the first pattern 111, and a depth map obtained through the depth sensor may be a depth map in which only the pixels corresponding to the first pattern 111 include depth information.

According to an embodiment of the disclosure, the AR device may use a two-dimensional (2D) image 121 (RGB image or the like) of the front area in order to obtain depth information of pixels not corresponding to the first pattern 111. According to an embodiment of the disclosure, the 2D image 121 of the front area may include edge information, color information, and the like of objects included in the front area. The AR device may obtain a depth map 131 including depth information for all pixels by compensating the depth map obtained through the depth sensor emitting the emission light having the first pattern 111, based on the 2D image 121 of the front area. For example, the depth information of the pixels not corresponding to the first pattern 111 may be determined from the depth information for surrounding pixels adjacent to the pixels and corresponding to the first pattern 111, based on the 2D image 121 of the front area. For example, when it is determined through information included in the 2D image 121 of the front area that a specific pixel not corresponding to the first pattern 111 has the same color as a surrounding pixel and an edge is not included between the specific pixel and the surrounding pixel, depth information of the specific pixel may be considered to be the same as depth information for the surrounding pixel. As such, the depth map 131 for the front area may be obtained (or, generated) using the depth information of some pixels of the front area obtained through the depth sensor and the 2D image 121 of the front area obtained through a camera or the like.

Referring to FIG. 1, a second pattern 112 may have a lower pattern density than the first pattern 111. The pattern density of the emission light may be determined to be a ratio of an area of the clipping plane of the depth sensor to the total area of the region irradiated with emission light on the clipping plane of the depth sensor. For example, the pattern density of the emission light may correspond to a ratio between the front area of the AR device and an actual measurement area for measuring a depth value through the depth sensor. In other words, a region irradiated with emission light having the second pattern 112 may have a smaller area than a region irradiated with the emission light having the first pattern 111. According to an embodiment of the disclosure, when the light emission unit of the depth sensor consumes a certain amount of power, the emission light illuminating a small area and having the second pattern 112 may have a greater intensity than the emission light having the first pattern 111, and thus may reach farther from the AR device. When the emission light reaches farther from the AR device, the depth sensor may sense a depth up to an object at a greater distance. In other words, referring to FIG. 1, when the light emission unit of the depth sensor consumes a certain amount of power, a depth map 132 sensed through the emission light having the second pattern 112 having a low pattern density may include depth information about a depth up to an object at a greater distance, than the depth map 131 sensed through the emission light having the first pattern 111 having a high pattern density.

As the pattern density of emission light decreases, the number of pixels that are to infer the depth information by using the images 121 and 122 increases. Accordingly, the depth map 132 sensed through the emission light having the second pattern 112 may include depth information about a depth up to a greater distance than the depth map 131 sensed through the emission light having the first pattern 111, but the depth map 131 sensed through the emission light having the first pattern 111 may include more accurate depth information for an individual pixel than the depth map 132 sensed through the emission light having the second pattern 112.

According to an embodiment of the disclosure, a method of adjusting an emission light pattern or a light emission period of the depth sensor in order to reduce the amount of power consumed by the depth sensor is provided. To this end, an activity of a user wearing the AR device is identified, and accuracy or a detection distance required by a depth map is determined based on the identified activity. The light pattern and light emission period of the emission light emitted by the depth sensor is adjusted based on the determined detection distance or accuracy, thereby reducing the amount of power consumed by the AR device, particularly, by the depth sensor.

Figure 2:
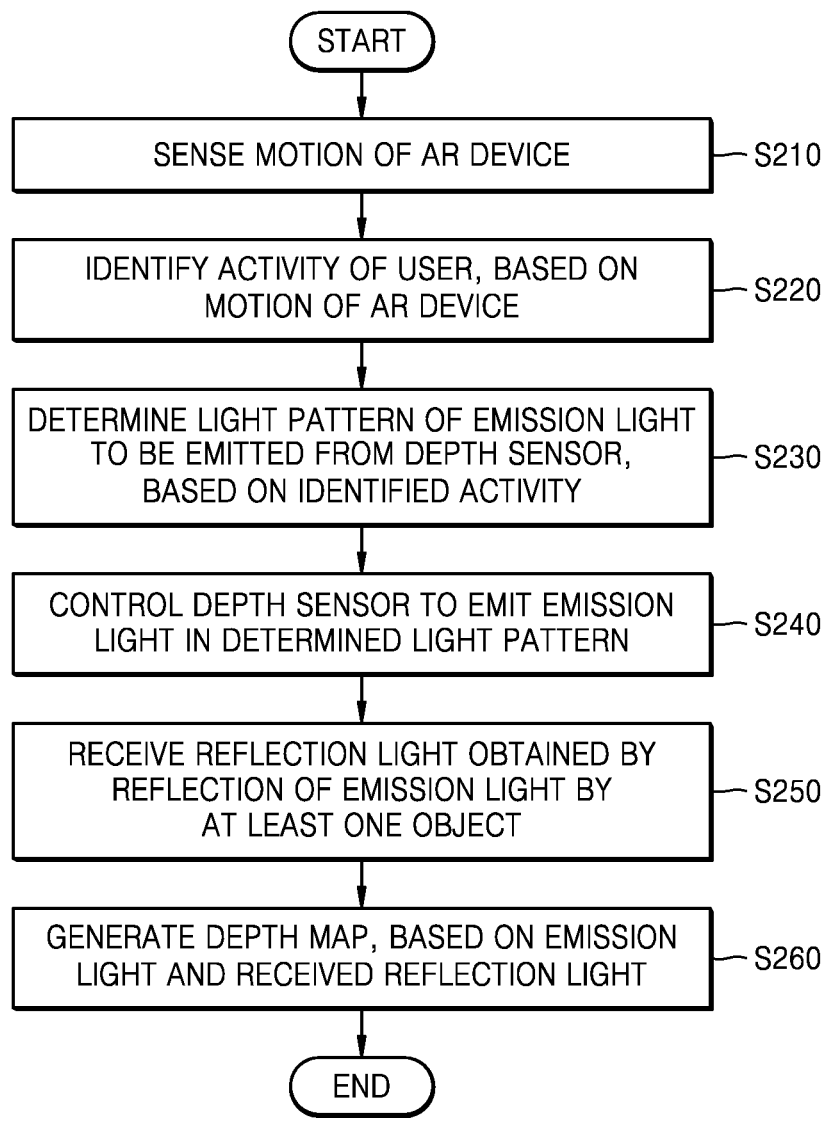
FIG. 2 is a flowchart of a method, performed by an AR device according to an embodiment of the disclosure, of obtaining a depth map by controlling the depth sensor.

FIG. 2 is a flowchart of a method, performed by the AR device according to an embodiment of the disclosure, of obtaining a depth map by controlling the depth sensor.

In operation S210, the AR device may sense a motion of the AR device. For example, a motion of a user wearing the AR device may be sensed by detecting a motion of the AR device. A motion sensor may be used to sense the motion of the AR device. The motion sensor may recognize various motions, such as a movement, translation, rotation, posture, position, and posture change, of the AR device. The motion sensor may include various sensors for recognizing the motion of the AR device, and may analyze and process pieces of data collected from the various sensors by software. For example, the motion sensor may include at least one of an inertial measurement unit (IMU) sensor including a gyroscope, an accelerometer, and a magnetometer, a global positioning system (GPS) sensor, or a wireless communication (WiFi, Bluetooth, or an ultra-wideband (UWB)) sensor.

In operation S220, the AR device may identify an activity of the user, based on the motion of the AR device. According to an embodiment of the disclosure, the AR device may calculate a movement and posture of the user wearing the AR device from sensed motion data. The AR device may identify the type of activity of the user from the calculated movement and posture of the user. According to an embodiment of the disclosure, the activity may represent a movement of the AR device itself, a movement of the user wearing the AR device, a posture of the user wearing the AR device, the type of activity of the user, or a combination of two or more thereof. For example, the activity of the user may be identified according to the posture and movement range of the user, like sitting, standing, walking, running, tennis, golf, or yoga, or may be identified in a form such as 'a state of sitting without movements', 'a state (running machine or the like) of walking without movements', or 'a state of standing while moving'.

In operation S230, the AR device may determine a light pattern of emission light to be emitted from the depth sensor, based on the identified activity. According to an embodiment of the disclosure, the AR device may determine a light pattern of emission light to be emitted from the depth sensor, based on the activity of the user. According to an embodiment of the disclosure, the AR device may determine a light density of the emission light, based on the activity. For example, when it is determined according to the identified user's activity that the user's movement is large, precise depth detection is not greatly required, and thus it may be determined to lower the density of the light pattern of the emission light. As such, the AR device may determine a density control of the light pattern, based on a required depth detection distance and a required precision of depth detection, and may determine the light pattern of the emission light in various forms.

According to an embodiment of the disclosure, the AR device may determine an intensity of the emission light to be emitted from the depth sensor, based on the identified activity. According to an embodiment of the disclosure, the intensity of the emission light may be adjusted by changing the pattern (light density) of the emission light, or may be adjusted by directly adjusting the intensity of light emitted by an emitter included in the depth sensor. For example, when the power consumed by the light emitting unit of the depth sensor is constant and the light pattern of the emission light is changed from a planar light source to a point light source, a light density in the area illuminated by a light source may relatively increase, and, as a result, the intensity of the emission light may be increased. As another example, as the power provided to the light emission unit of the depth sensor increases, the intensity of light emitted by each emitter may increase, and the intensity of the entire emission light may be increased. According to an embodiment of the disclosure, the AR device may determine a sensing period (frame rate) of the depth sensor, based on the identified activity.

For example, as the movement of the user wearing the AR device increases, the AR device may determine that precise depth sensing is not required, and may lower the light pattern density of the emission light. In this case, a light density in the area irradiated by the emission light may be relatively increased due to lowering of the light pattern density of the emission light, and the sensing distance of the depth sensor may be increased due to an increase in the light intensity in the area. As the movement of the user wearing the AR device increases, the AR device may determine that quick update of depth information is required, and thus may quickly adjust the sensing frame rate of the depth sensor.

For example, the AR device may adjust a light output of the emission light by adjusting the emission levels of the emitters included in the light emission unit of the depth sensor. For example, when the emission levels of the emitters increase, the light output of the light emission unit including the emitters increases, and the intensity of the emission light emitted by the depth sensor through the light emission unit increases. When the intensity of the emission light increases, the emission light may reach a greater distance, and thus a depth detection distance increases. When the intensity of the emission light decreases, the detection distance of the depth sensor may decrease, but power consumption of the AR device may be reduced. Accordingly, when there is a need to detect a farther depth, the light output of the light emitting unit may be increased, and, when there is a need to reduce power consumption even when only a near depth is detected, the light output may be reduced. As such, the AR device may determine the intensity of the emission light, based on a required depth detection distance and a required power consumption degree, by adjusting the light output.

According to an embodiment of the disclosure, the light emission unit of the depth sensor may emit pulse-type emission light, and the AR device may determine the period of the pulse-type emission light. As the emission period of the emission light decreases, battery consumption may be reduced. According to an embodiment of the disclosure, the AR device may lengthen the sensing frame rate of the depth sensor in order to reduce power consumption, or may shorten the sensing frame rate of the depth sensor in order to increase power consumption.

According to an embodiment of the disclosure, the AR device may additionally sense surrounding environment information. The AR device may sense the surrounding environment information through an environment sensor. The environment sensor may recognize various pieces of information such as a location of the AR device, an ambient brightness, an ambient weather, and a current time. The environment sensor may include various sensors for recognizing the surrounding environment information of the AR device, and may analyze and process pieces of data collected from the various sensors by software. For example, the environment sensor may include at least one of an illumination sensor, a GPS sensor, a weather sensor, or a clock.

According to an embodiment of the disclosure, the AR device may identify the location of the AR device or the ambient illuminance of the AR device, based on the sensed surrounding environment information. Thereafter, the AR device may adjust the light pattern of the emission light to be emitted from the depth sensor, based on the identified location or ambient illuminance. For example, when it is determined that the location of the user wearing the AR device is outdoors, a longer detection distance is required than when the location of the user wearing the AR device is indoors, and thus it may be determined to increase the light intensity within the area irradiated with the emission light by lowering the density of the light pattern of the emission light and relatively increasing the light density within the area irradiated with the emission light.

The AR device according to an embodiment of the disclosure may adjust a sensing distance of the depth sensor within the same power consumption or adjust the sensing distance of the depth sensor and power consumption together, by adjusting the light pattern of the emission light. The AR device according to an embodiment of the disclosure may prevent an increase in power consumption even with a quickly adjustment of the sensing frame rate of the depth sensor, by adjusting the light pattern of the emission light.

In operation S240, the AR device may control the depth sensor to emit emission light in the determined light pattern.

According to an embodiment of the disclosure, the depth sensor may include a light emission unit including at least one emitter, and the AR device may control an operation of the at least one emitter to emit emission light in the determined light pattern. An emitter and a method of controlling an operation of the emitter, according to an embodiment of the disclosure, will be described in more detail with reference to FIGS. 6A and 6B, which will be described later.

According to an embodiment of the disclosure, the light emission unit includes a plurality of light source modules that emit emission light in different light patterns. In this case, the AR device may individually control respective on/off states of the plurality of light source modules in order to emit the emission light in the determined light pattern. According to an embodiment of the disclosure, the AR device may select a light source module corresponding to the determined light pattern from among the plurality of light source modules, set the selected light source module to an on state, and set the light source modules other than the selected light source module to off states. A light source module and a method of controlling an operation of the light source module, according to an embodiment of the disclosure, will be described in more detail later with reference to FIG. 5, which will be described later.

According to an embodiment of the disclosure, the depth sensor may include the light emission unit and a variable focus (varifocal) lens. For example, the emission light emitted by the depth sensor may be emitted from the light emission unit to the front area of the AR device through the varifocal lens. At this time, the AR device may control the varifocal lens to emit emission light in the determined light pattern. According to an embodiment of the disclosure, the light emission unit may include a plurality of emitters arranged in a grid array. The AR device may additionally control an operation of at least one emitter to emit emission light in the determined light pattern. According to an embodiment of the disclosure, the varifocal lens may include an upper electrode or a patterned upper electrode, in which whether a voltage is applied and the intensity of the applied voltage may be individually controlled. A varifocal lens and a method of controlling an operation of the varifocal lens, according to an embodiment of the disclosure, will be described in more detail with reference to FIGS. 8 through 13, which will be described later.

According to an embodiment of the disclosure, the depth sensor may include the light emission unit, and a liquid crystal mirror (LCM) configured to control a direction of light emitted by the light emission unit. For example, the emission light emitted by the depth sensor may be emitted from the light emission unit, reflected by the LCM, and emitted toward the front area of the AR device. At this time, the AR device may control the LCM to emit emission light in the determined light pattern. An LCM and a method of controlling an operation of the LCM, according to an embodiment of the disclosure, will be described in more detail with reference to FIGS. 14 through 16, which will be described later.

In operation S250, the light detection unit of the depth sensor may receive reflected light. According to an embodiment of the disclosure, the light detection unit may receive reflection light obtained due to reflection of the emission light by at least one physical object located in the front area of the AR device. According to an embodiment of the disclosure, the light detection unit may include a sensor for sensing the same type of light as the emission light emitted by the light emission unit, and a rolling shutter type sensor or a global shutter type sensor is applicable to the light detection unit.

In operation S260, the AR device may generate (or, obtain) a depth map for the front area, based on the emission light and the received reflection light. According to an embodiment of the disclosure, the AR device may obtain moving time information of light by measuring a delay or phase shift between the emission light and the received reflection light, and may obtain depth information by using the moving time information.

According to an embodiment of the disclosure, as described above with reference to FIG. 1, the AR device may use an image of the front area to obtain depth information for pixels not corresponding to the light pattern of the emission light, namely, pixels unable to obtain depth information through the depth sensor. The image of the front area may include edge information, color information, and the like of the objects included in the front area, and may be obtained through an image sensor such as an RGB sensor. According to an embodiment of the disclosure, the AR device may obtain a depth map including depth information for all pixels, by compensating the depth map obtained through the depth sensor, based on a front area image obtained through the image sensor.

Figure 3:
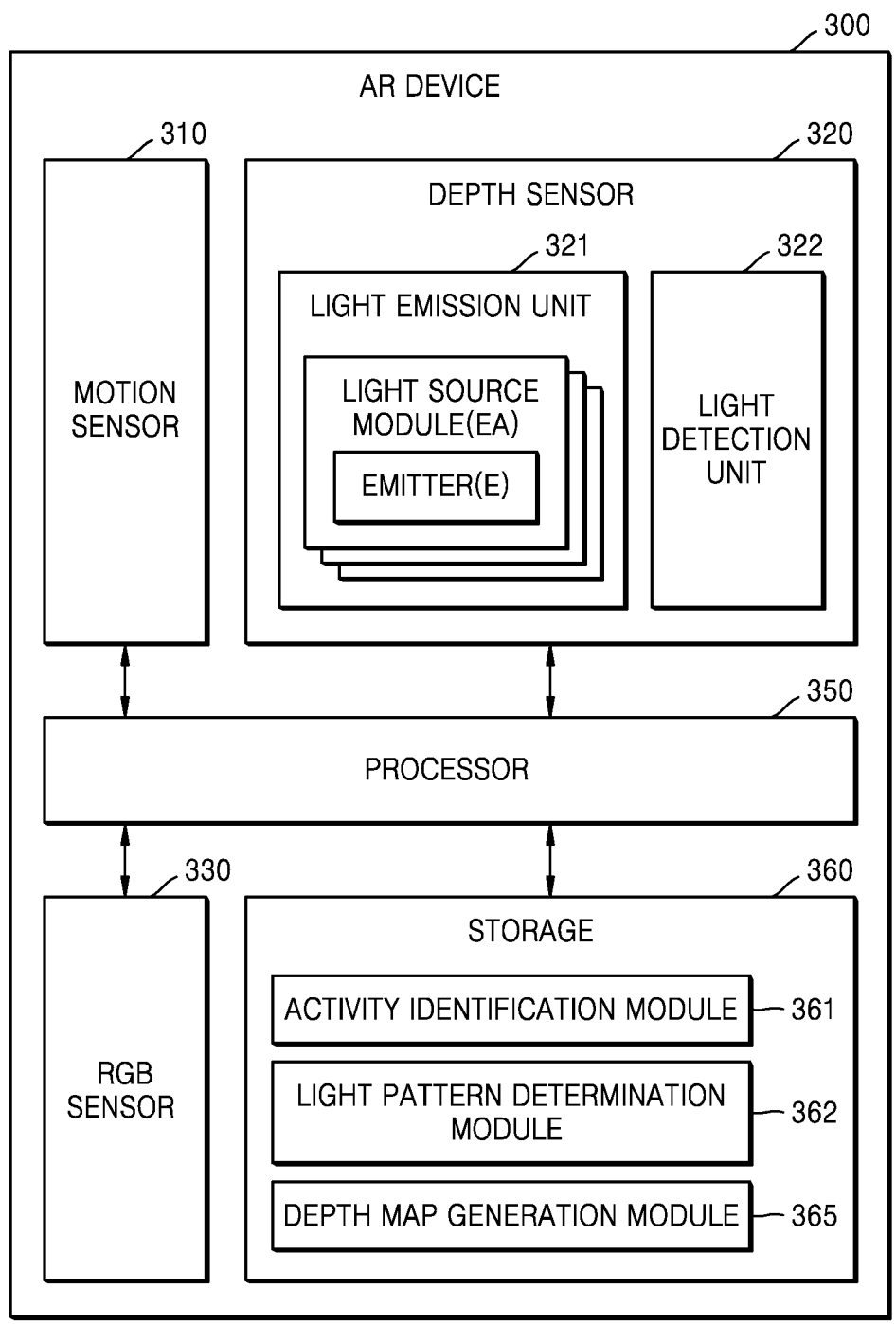
FIG. 3 is a block diagram of an AR device according to an embodiment of the disclosure.

FIG. 3 is a block diagram of an AR device 300 according to an embodiment of the disclosure.

Referring to FIG. 3, the AR device 300 may include a motion sensor 310, a depth sensor 320, an RGB sensor 330, a processor 350, and a storage 360. The depth sensor 320 may include a light emission unit 321 including at least one of a light source module EA or an emitter E, and a light detection unit 322. All of the components illustrated in FIG. 3 are not essential components of the AR device 300. More or less components than those illustrated in FIG. 3 may constitute the AR device 300.

The motion sensor 310 may sense a motion of the AR device 300. The motion sensor 310 may recognize various motions, such as a movement, translation, rotation, posture, position, and posture change, of the AR device 300. The motion sensor 310 may include various sensors for recognizing motions of the AR device 300, and may analyze and process pieces of data collected from the various sensors by software. For example, the motion sensor 310 may include at least one of an IMU sensor, a GPS sensor, or an UWB sensor.

The IMU sensor may represent an inertial measurement sensor. The IMU sensor may measure a physical quantity by using inertia, and may include an accelerator, a gyroscope, and a magnetometer. The IMU sensor may measure a degree to which the AR device 300 is inclined, by sensing a linear acceleration or decomposing an acceleration of gravity through the accelerator. The IMU sensor may sense a rotational speed of the AR device 300 through the gyroscope. The IMU sensor may calculate a moving speed and a moving distance of the AR device 300 by integrating a detected acceleration. The magnetometer may measure a degree to which the AR device 300 is distorted based on a magnetic north, by measuring the intensity of a magnetic flux.

The GPS sensor is a global positioning system, and may determine a position by receiving microwaves from artificial satellites through a receiver. The GPS sensor may measure a position of the AR device 300. The GPS sensor may have limited use in tunnels, inside buildings, or in the presence of electronic interference. When the GPS sensor cannot be used as described above, the IMU sensor may assist in measuring the position of the AR device 300.

The UWB sensor may be a radar-based motion recognition sensor. UWB has a function of transmitting a UWB signal of several GHz and receiving a return signal resulting from the transmitted signal, and may measure a signal transmission and reception time to identify presence or absence of an object (person or thing) and calculate a distance from the object. A radar-based motion recognition sensor such as the UWB sensor enables a movement of and a position of an object to be tracked in real time. The UWB sensor may ascertain the position of the AR device 300 in a limited space such as a local distance and the indoors.

The depth sensor 320 may obtain a three-dimensional (3D) image or depth information for the surroundings of the AR device 300. The depth sensor may obtain a 3D image for a real physical thing. The 3D image includes depth information of each pixel included in an image. The depth sensor (or a 3D depth camera) 320 is a type of computational camera, and may generate an image including depth information by reprocessing images coming from subjects through a lens through computation. The depth sensor 320 may be used in indoor mapping, AR realization, development of autonomous driving devices, and the like.

Types of the depth sensor 320 may be roughly classified into a stereo type, a ToF type, and a structured light (SL) type. A stereo type depth sensor is a sensor that generates a stereoscopic image by combining two 2D image sensors, and uses a viewpoint mismatch between cameras in order to measure a distance to a subject. An SL type depth sensor uses an optical 3D scanning method of projecting an SL pattern onto a subject and capturing a resultant image by using an image sensor. The SL type depth sensor may calculate the distortion degree of a pattern by comparing a projected light pattern with a light pattern received by being reflected by the subject, calculate a depth from the distortion of the pattern, and obtain a 3D image of the subject.

A ToF type depth sensor obtains moving time information of light by measuring a delay or phase shift between emission light and received reflection light, and obtains depth information by using the moving time information. The light used in the ToF type depth sensor may be located in a near-infrared spectrum region. A light emission unit and a light receiver in the ToF type depth sensor may be constructed with a pixel array to measure distances to all physical objects within a recognition region.

The AR device 300 according to an embodiment of the disclosure may include a ToF type depth sensor 320. Referring to FIG. 3, the depth sensor 320 may include the light emission unit 321 including at least one of the light source module EA or the emitter E, and the light detection unit 322.

The light emission unit 321 may emit emission light to an area of which a depth map is to be generated, for example, the front area of the AR device 300. The emission light emitted by the light emission unit 321 may be emitted in a specific light pattern. According to an embodiment of the disclosure, a light pattern may correspond to a pattern that represents an area irradiated by emission light on a FoV cross-section of the depth sensor 320.

The light emission unit 321 may include a laser that generates emission light and emits the emission light to the outside of the AR device 300. For example, the light emission unit 321 may include a vertical-cavity surface-emitting laser (VCSEL). The VCSEL is a vertical cavity surface light emitting laser, and may be a type of semiconductor laser diode that emits a laser in a direction perpendicular to an upper surface.

According to an embodiment of the disclosure, the light emission unit 321 may include a plurality of light source modules EA. Each of the light source modules EA may include a VCSEL. According to an embodiment of the disclosure, the plurality of light source modules EA may emit emission light in different light patterns, respectively. Respective on/off states of the plurality of light source modules EA may be individually controlled. For example, the light emission unit 321 may include a first light source module and a second light source module. The first light source module may emit emission light in a first light pattern, the second light source module may emit emission light in a second light pattern. Power of the first light source module and power of the second light source module may be individually controlled. For example, when there is a need to radiate emission light in the first light pattern, the AR device 300 may turn on the first light source module and turn off the second light source module so that a light pattern of emission light finally emitted to the front area of the AR device 300 is the first light pattern. According to an embodiment of the disclosure, when there is a need to radiate emission light in a third light pattern corresponding to a combination of the first light pattern and the second light pattern, the AR device 300 may turn on both the first light source module and the second light source module.

According to an embodiment of the disclosure, the light emission unit 321 may include at least one emitter E. The emitter E may include a point light source laser that generates emission light having a point pattern. According to an embodiment of the disclosure, a plurality of emitters E may be arranged in a grid array. According to an embodiment of the disclosure, the AR device 300 may control the light pattern of the emission light emitted by the light emission unit 321 by controlling an operation of at least one emitter E included in the light emission unit 321. For example, on/off operations of emitters E implemented as point light source lasers or intensities of emitted laser beams may be individually controlled. According to an embodiment of the disclosure, the light emission unit 321 may be considered a group of a plurality of emitters E. Due to the individual controls of on/off operations of the emitters E, the light pattern of the emission light emitted by the light emission unit 321 may be variously controlled.

The light detection unit 322 may receive reflection light obtained by reflection of the emission light emitted by the light emission unit 321 by at least one physical object located in the front area of the AR device 300. The light detection unit 322 may include a sensor that senses the same type of light as the emission light emitted by the light emission unit 321. For example, when the light emission unit 321 emits infrared (IR) light, the light detection unit 322 may include an IR sensor capable of sensing IR light. According to an embodiment of the disclosure, a rolling shutter type sensor or a global shutter type sensor is applicable to the light detection unit 322.

The RGB sensor 330 or a camera may photograph the front area of the AR device 300. The RGB sensor 330 may obtain an RGB image of the front area of the AR device 300. The RGB sensor 330 may obtain an image frame, such as a still image or a moving picture, via an image sensor, when an application requiring a photographing function is executed. An image captured via the image sensor may be processed by the processor 350 or a separate image processor.

The storage 360 may store a program that is to be executed by the processor 350, which will be described later. The storage 360 may store a program including one or more instructions for controlling an operation of the AR device 300. Instructions and program code readable by the processor 350 may be stored in the storage 360. According to an embodiment of the disclosure, the processor 350 may be implemented to execute instructions or codes of the program stored in the storage 360. The storage 360 may store data that is input to the AR device 300 or output by the AR device 300.

The storage 360 may include at least one type of storage medium from among a flash memory, a hard disk, a multi-media card micro type storage medium, a card type memory (for example, SD or XD memory), a random access memory (RAM), a static RAM (SRAM), a read-only memory (ROM), an electrically erasable programmable ROM (EEPROM), a programmable ROM (PROM), a magnetic memory, a magnetic disk, and an optical disk.

The programs stored in the storage 360 may be classified into a plurality of modules according to their functions. For example, the storage 360 may include an activity identification module 361, a light pattern determination module 362, and a depth map generation module 365.

The processor 350 may control overall operations of the AR device 300. The processor 350 may perform operations according to an embodiment of the disclosure. For example, the processor 350 may control all of the motion sensor 310, the depth sensor 320, the RGB sensor 330, and the storage 360 by executing the programs stored in the storage 360.

The processor 350 may include hardware components that perform arithmetic, logic, and input/output operations and signal processing. The processor 350 may include, but is not limited to, at least one of a central processing unit, a microprocessor, a graphics processing unit, application specific integrated circuits (ASICs), digital signal processors (DSPs), digital signal processing devices (DSPDs), programmable logic devices (PLDs), or field programmable gate arrays (FPGAs).

According to an embodiment of the disclosure, the processor 350 may execute one or more instructions stored in the storage 360 to identify the motion of the AR device 300 worn by the user through the motion sensor 310, identify the activity of the user, based on the motion of the AR device 300, determine the light pattern of the emission light emitted by the depth sensor 320, based on the activity, control the light emission unit 321 to emit the emission light in the determined light pattern, receive reflection light obtained by reflection of the emission light by the at least one physical object located in the front area of the AR device 300 through the light detection unit 322, and generate the depth map for the front area of the AR device 300, based on the emission light and the received reflection light.

According to an embodiment of the disclosure, the processor 350 may execute one or more instructions of the activity identification module 361 from among the programs stored in the storage 360 to identify the activity of the user, based on the motion of the AR device 300 identified through the motion sensor 310. According to an embodiment of the disclosure, the processor 350 may identify the movement of the AR device 300 from the motion data sensed through the motion sensor 310. The processor 350 may calculate a movement and posture of the user wearing the AR device 300 from the identified movement of the AR device 300. The processor 350 may identify the type of the activity of the user from the calculated movement and posture of the user. According to an embodiment of the disclosure, the activity may represent a movement of the AR device 300, a movement of the user wearing the AR device 300, a posture of the user wearing the AR device 300, the type of the activity of the user, or a combination of two or more thereof.

According to an embodiment of the disclosure, the processor 350 may execute one or more instructions of the light pattern determination module 362 from among the programs stored in the storage 360 to determine the light pattern of the emission light to be emitted by the depth sensor 320, based on the activity of the user or the location of the AR device 300 identified based on the surrounding environment information of the AR device 300. According to an embodiment of the disclosure, the light pattern may correspond to a pattern that represents an area irradiated by emission light on a FoV cross-section of the depth sensor 320. According to an embodiment of the disclosure, the processor 350 may adjust the density of the light pattern of the emission light, based on the activity of the user and the location of the AR device 300. The density of the light pattern may be determined to be a ratio of the area of the FoV cross-section of the depth sensor 320 to the total area of a region irradiated with the emission light on the FoV cross-section of the depth sensor 320. For example, the density of the light pattern may correspond to a ratio between the front area of the AR device 300 and an actual measurement area for measuring a depth value through the depth sensor 320.

According to an embodiment of the disclosure, when the light emission unit 321 of the depth sensor 320 consumes a certain amount of power and the density of the light pattern is decreased, the light intensity of the region irradiated by the emission light is increased. When the intensity of the emission light emitted by the depth sensor 320 increases, the emission light may reach a greater distance, and thus a depth detection distance increases. Accordingly, when precise depth detection is not required, the detection distance of the depth sensor 320 may be increased by reducing the density of the light pattern.

For example, when it is determined according to the user's activity that the user's movement is large, precise depth detection is not greatly required, and thus it may be determined to lower the density of the light pattern of the emission light. For example, when it is determined that the location of the user wearing the AR device 300 is outdoors, a longer detection distance is required than when the location of the user wearing the AR device 300 is indoors, and thus it may be determined to lower the density of the light pattern of the emission light. The processor 350 may determine a density control of the light pattern, based on a required depth detection distance and a required precision of depth detection, and may determine the light pattern of the emission light in various forms.

According to an embodiment of the disclosure, the processor 350 may execute one or more instructions of the depth map generation module 365 from among the programs stored in the storage 360 to control the depth sensor 320 to emit emission light in the determined light pattern, with the determined light intensity, and at the determined sensing frame rate. According to an embodiment of the disclosure, the processor 350 may control an operation of the at least one emitter E included in the light emission unit 321, in order to control the depth sensor 320. According to an embodiment of the disclosure, the processor 350 may individually control the respective on/off states of the plurality of light source modules EA. According to an embodiment of the disclosure, the processor 350 may control the varifocal lens through which light emitted by the light emission unit 321 passes before being emitted toward the front area of the AR device 300, in order to adjust the light pattern of the emission light. According to an embodiment of the disclosure, the processor 350 may control a LCM by which the light emitted by the light emission unit 321 is reflected before being emitted toward the front area of the AR device 300, in order to adjust the direction of the light emitted by the light emission unit 321.

According to an embodiment of the disclosure, the processor 350 may execute one or more instructions of the depth map generation module 365 from among the programs stored in the storage 360 to receive reflection light obtained by reflection of the emission light by the at least one physical object located in the front area of the AR device 300 through the light detection unit 322. Thereafter, the processor 350 may calculate a depth value for the depth measurement area, based on the emission light and the received reflection light, and may generate a depth map for the front area of the AR device 300, based on the calculated depth value.

According to an embodiment of the disclosure, the processor 350 may execute one or more instructions of the depth map generation module 365 from among the programs stored in the storage 360 to compensate the depth map for the front area of the AR device 300, based on an RGB image of the front area of the AR device 300. The RGB image may be obtained through the RGB sensor 330.

According to an embodiment of the disclosure, the emission light may be a pattern light source that partially illuminates the front area, rather than a planar light source that illuminates the entire front area. The front area of the AR device 300 may be divided into a 'measurement area' to which the light emission unit 321 of the depth sensor 320 radiates emission light, and a 'non-measurement area' excluding the 'measurement area' from the front area. On the depth map, pixels corresponding to the measurement area have depth values measured through the depth sensor 320, but pixels corresponding to the non-measurement area do not have the depth values measured through the depth sensor 320. According to an embodiment of the disclosure, the processor 350 may calculate depth values of the pixels corresponding to the non-measurement area through a sample analysis of the RGB image and the depth values of the pixels included in the measurement area adjacent to the non-measurement area. According to an embodiment of the disclosure, the processor 350 may generate a final depth map including a depth value for the entire front area, by compensating the depth map generated through the depth sensor 320, based on the RGB image obtained through the RGB sensor 330.

Figure 4:
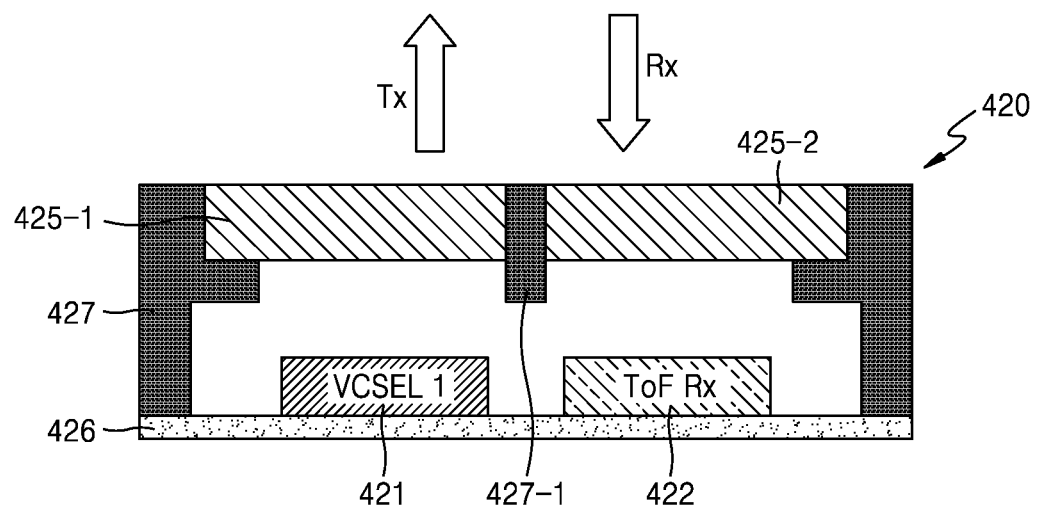
FIG. 4 is a cross-sectional view for describing an operation of a depth sensor, according to an embodiment of the disclosure.

FIG. 4 is a cross-sectional view for describing an operation of a depth sensor 420, according to an embodiment of the disclosure.

An AR device according to an embodiment of the disclosure may include a depth sensor 420 of a ToF type. Referring to FIG. 4, the depth sensor 420 of a ToF type may include a light emission unit 421, a light detection unit 422, first and second optical units 425-1 and 425-2, a substrate 426, and a housing 427. All of the components illustrated in FIG. 4 are not essential components of the depth sensor 420. More or less components than those illustrated in FIG. 4 may constitute the depth sensor 420.

The light emission unit 421 of FIG. 4 may correspond to the light emission unit 321 of FIG. 3 described above. The light detection unit 422 of FIG. 4 may correspond to the light detection unit 322 of FIG. 3 described above. Referring to FIG. 4, one light emission unit 421 and one light detection unit 422 may be arranged side by side on the same level, but embodiments of the disclosure are not limited to this arrangement. The respective numbers of light emission units 421 and light detection units 422 and a layout of the light emission unit 421 and the light detection unit 422 may vary.

The depth sensor 420 referred to as "indirect type" or "ToF type" uses the light emission unit 421 to emit modulated light waves (modulated light, modulated optical signal) Tx, and the modulated light may have a sinusoidal wave, a pulse train, or other periodic waveforms. The depth sensor 420 may detect modulated light Rx reflected by surfaces of objects included in a scene for which a depth map is to be obtained. The depth sensor 420 may measure a phase difference between the emitted modulated light Tx and the received modulated light Rx to calculate physical distances between the depth sensor 420 and the objects included in the scene. With respect to a specific distance, the phase difference between the emitted modulated light Tx and the received modulated light Rx may be proportional to a modulating frequency of modulated light. The depth sensor 420 obtains moving time information by measuring a delay or phase change of a modulated optical signal with respect to all pixels of the scene. A modulated optical signal Tx emitted by the depth sensor 420 to measure depth information may be located in a near-infrared spectrum region. The modulated optical signal Tx emitted by the depth sensor 420 may be constructed as a pixel array to measure depth information for each of the pixels of the scene.

According to an embodiment of the disclosure, the AR device measures a time delay of received reflection light for emission light emitted by each pixel through the depth sensor 420, and depth information for each pixel may be measured based on a phase change of the reflection light with respect to the emission light and the lapse of time. According to the disclosure, a "depth" may roughly refer to a distance from a surface point to a reference point of the depth sensor, rather than a z-direction component that is a distance in a direction perpendicular to the xy plane of an image sensor. According to the disclosure, a "depth" and a "distance" may be used interchangeably when describing a ToF measurement value.

Referring to FIG. 4, an optical unit may include the first optical unit 425-1 and the second optical unit 425-2. The first optical unit 425-1 may disperse emission light emitted by the light emission unit 421 such that the emission light has a spatially uniform light intensity. According to an embodiment of the disclosure, the first optical unit 425-1 may include a plurality of microlenses and a diffractive element (DOE) for dispersing light. The diffractive element and the plurality of microlenses may disperse light to have a determined viewing angle and a determined beam profile in a space. According to an embodiment of the disclosure, the second optical unit 425-2 may collect reflection light reflected by the objects to the light detection unit 422, and may increase light collection efficiency by using a microlens. According to an embodiment of the disclosure, the first optical unit 425-1 and the second optical unit 425-2 may be separately constructed as shown in FIG. 4 or may be implemented as a single continuous component.

The light emission unit 421, the light detection unit 422, and various components of the depth sensor 420 may be mounted on the substrate 426. The substrate 426 may connect the light emission unit 421, the light detection unit 422, and the various components to an external circuit, and may protect the various components of the depth sensor 420 from external impacts and support them. For example, the substrate 426 may include a silicon substrate such as a printed circuit board (PCB) or a silicon re-wiring layer.

The housing 427 may cover the top of the substrate 426 and the components of the depth sensor 420. The housing 427 may protect the components of the depth sensor 420 from an external environment and may be created using a mold process. The housing 427 may include an epoxy molding compound (EMC) or a clear molding compound (CMC). According to an embodiment of the disclosure, the housing 427 may be omitted. Referring to FIG. 4, the depth sensor 420 may further include a protrusion 427-1 arranged between the first optical unit 425-1 corresponding to the light emission unit 421 and the second optical unit 425-2 corresponding to the light detection unit 422. The protrusion 427-1 may prevent noise in which the emission light emitted by the light emission unit 421 directly reaches the light detection unit 422.

Figure 5:
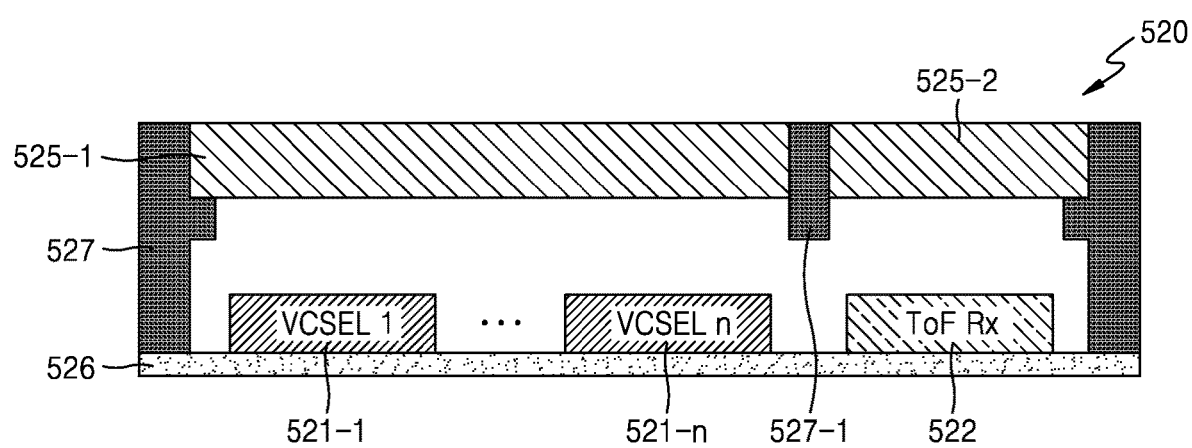
FIG. 5 is a cross-sectional view of a depth sensor according to an embodiment of the disclosure.

FIG. 5 is a cross-sectional view of a depth sensor 520 according to an embodiment of the disclosure.

Referring to FIG. 5, the depth sensor 520 may include a light emission unit including a plurality of light source modules, namely, first through n-th light source modules 521-1 through 521-n, a light detection unit 522, first and second optical units 525-1 and 525-2, a substrate 526, and a housing 527. All of the components illustrated in FIG. 5 are not essential components of the depth sensor 520. More or less components than those illustrated in FIG. 5 may constitute the depth sensor 520. The light detection unit 522, the first and second optical units 525-1 and 525-2, the substrate 526, the housing 527, and a protrusion 527-1 of FIG. 5 may correspond to the light detection unit 422, the first and second optical units 425-1 and 425-2, the substrate 426, the housing 427, and the protrusion 427-1 of FIG. 4, respectively.

Referring to FIG. 5, the light emission unit may include the plurality of light source modules 521-1 through to 521-n. Each light source module (emitter array) EA may include a plurality of emitters E. One light source module EA may be implemented as an array of a plurality of emitters E. For example, each emitter E may include a VCSEL. According to an embodiment of the disclosure, the plurality of light source modules 521-1 through to 521-n may have different emission light patterns. In other words, the plurality of light source modules EA may emit emission light in different light patterns.

Referring to FIG. 5, the depth sensor 520 may include n light source modules EA. For example, the depth sensor 520 may include the first light source module 521-1, the second light source module, . . . , and the n-th light source module 521-n. The number of emitters E included in the first light source module 521-1 may be different from the number of emitters E included in the n-th light source module 521-n, and an array of emitters E of the first light source module 521-1 may be different from an array of emitters E of the n-th light source module 521-n.

According to an embodiment of the disclosure, respective on/off states of the plurality of light source modules 521-1 through to 521-n may be individually controlled. For example, when the first light source module 521-1 may emit emission light in a first light pattern and the n-th light source module 521-n emits emission light in an n-th light pattern, power of the first light source module 521-1 and power of the n-th light source module 521-n may be individually controlled. For example, when there is a need to radiate emission light in the first light pattern, the AR device may turn on the first light source module 521-1 and turn off the n-th light source module 521-n so that a light pattern of emission light finally emitted to the front area of the AR device is the first light pattern. According to an embodiment of the disclosure, when there is a need to radiate emission light in the third light pattern corresponding to a combination of the first light pattern and the second light pattern, the AR device may turn on the first light source module 521-1 and the second light source module 521-2 and may turn off the other light source modules.

According to an embodiment of the disclosure, the first optical unit 525-1 corresponding to the plurality of light source modules 521-1 through to 521-n may be implemented as a continuous single component as shown in FIG. 5, but the first optical unit 525-1 may be constructed as n first optical units 525-1 such that one first optical unit 525-1 corresponds to each of the plurality of light source modules 521-1 through to 521-*n* or the first optical unit 525-1 may be constructed such that one first optical unit 525-1 corresponds to at least one light source module.

Figure 6A:
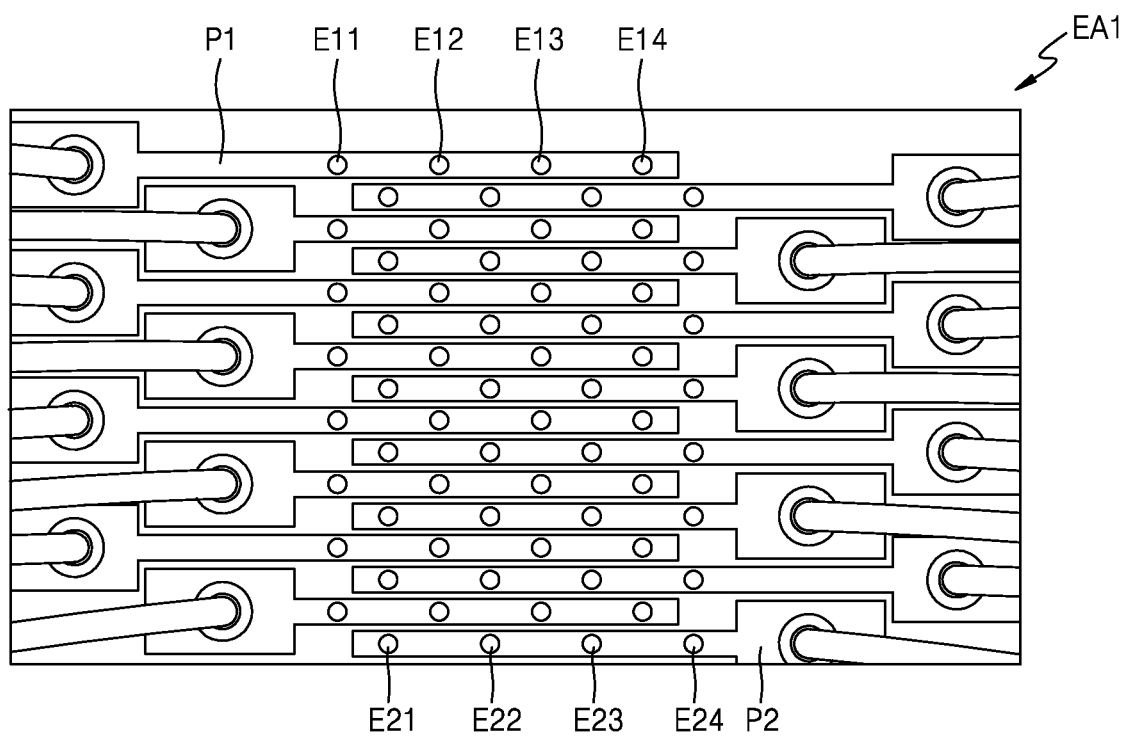
FIG. 6A is a view for explaining a light emission unit of a depth sensor according to an embodiment of the disclosure.
Figure 6B:
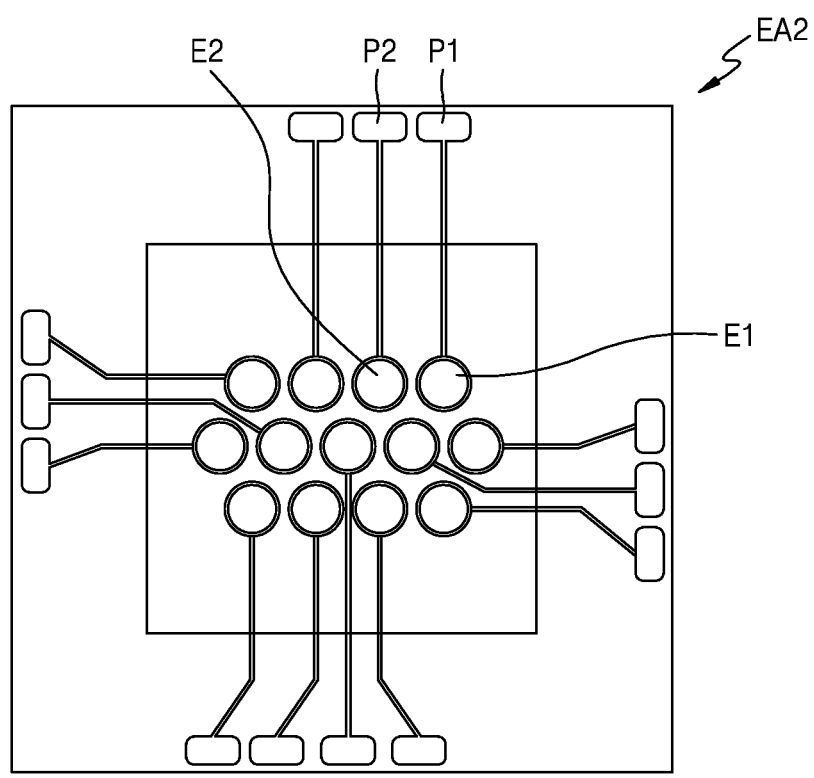
FIG. 6B is a view for explaining a light emission unit of a depth sensor according to an embodiment of the disclosure.

FIGS. 6A and 6B are views for explaining a light emission unit of a depth sensor according to an embodiment of the disclosure.

According to the disclosure, the light emission unit represents a structure for generating emission light for measuring depth information in a ToF type depth sensor. According to the disclosure, an emitter E represents one unit that generates emission light such as a laser, and a light source module represents an emitter array formed by arranging a plurality of emitters E. According to an embodiment of the disclosure, an array of a plurality of emitters E may constitute one light source module. According to an embodiment of the disclosure, the light emission unit may be constructed with one light source module, or may be constructed with a plurality of light source modules as shown in FIG. 5 described above.

According to an embodiment of the disclosure, the emitter E may include a point light source laser (for example, a VCSEL) that generates emission light having a point pattern. According to an embodiment of the disclosure, the plurality of emitters E may be arranged in a grid array to constitute one light source module or one light emission unit. For example, the plurality of emitters E may be arranged in a square grid array or a hexagonal grid array (honeycomb array). According to an embodiment of the disclosure, the AR device may control the light pattern of the emission light emitted by the light emission unit, by controlling an operation of the at least one emitter E included in the light emission unit. According to an embodiment of the disclosure, the emitters E included in the light emission unit may be connected to each other in units of a preset number of emitters E. In this case, the AR device may control the light emission unit of the depth sensor by controlling operations of the emitters E in units of a preset number of emitters E.

Referring to FIG. 6A, according to an embodiment of the disclosure, a light source module EA1 may include 4*16 (=64) emitters E. Emitters E may be arranged in a honeycomb array, and every 4 emitters E may be connected to one pad P. The emitters E may be provided with power through the pad P. An AR device including the light source module EA1 of FIG. 6A may control on/off states of every 4 emitters E or the intensities of light beams emitted by every 4 emitters E. For example, four emitters E11, E12, E13, and E14 may be connected to a first pad P1, and other four emitters E21, E22, E23, and E24 may be connected to a second pad P2. According to an embodiment of the disclosure, the AR device may control the light source module EA1 to provide power to emitters connected to the first pad P1 (turn on the emitters) and provide no power to emitters connected to the second pad P2 (turn off the emitters).

Referring to FIG. 6B, according to an embodiment of the disclosure, a light source module EA2 may include 13 emitters E. Emitters E may be arranged in a honeycomb array, and each emitter E may be connected to one pad P. An AR device including the light source module EA2 of FIG. 6B may control an on/off state of each emitter E or the intensity of light emitted by each emitter E. For example, a first emitter E1 may be connected to a first pad P1, and a second emitter E2 may be connected to a second pad P2. According to an embodiment of the disclosure, the AR device may control the light source module EA2 to provide power to the first emitter E1 connected to the first pad P1 (turn on the emitter E1) and provide no power to the second emitter E2 connected to the second pad P2 (turn off the emitter E1).

As such, an on/off state of an emitter E implemented as a point light source laser or the intensity of laser light emitted by the emitter E may be individually controlled according to a pad to which the emitter E is connected. The light emission unit may be considered a group of a plurality of emitters E. In this case, due to individual controls of respective on/off states of the emitters E and the intensities of light beams emitted by the emitters E, the light pattern of the emission light emitted by the light emission unit may be variously controlled. As the number of emitters E connected to one pad decreases, the light pattern of emission light emitted by the light emission unit may be variously controlled. For example, when a pad for supplying power and an emitter E are connected to each other in a one-to-one correspondence as shown in FIG. 6B, the pad and the emitter E may generate emission light having various patterns, compared with when the pad and the emitter E are connected to each other in a one-to-four correspondence.

Figure 7:
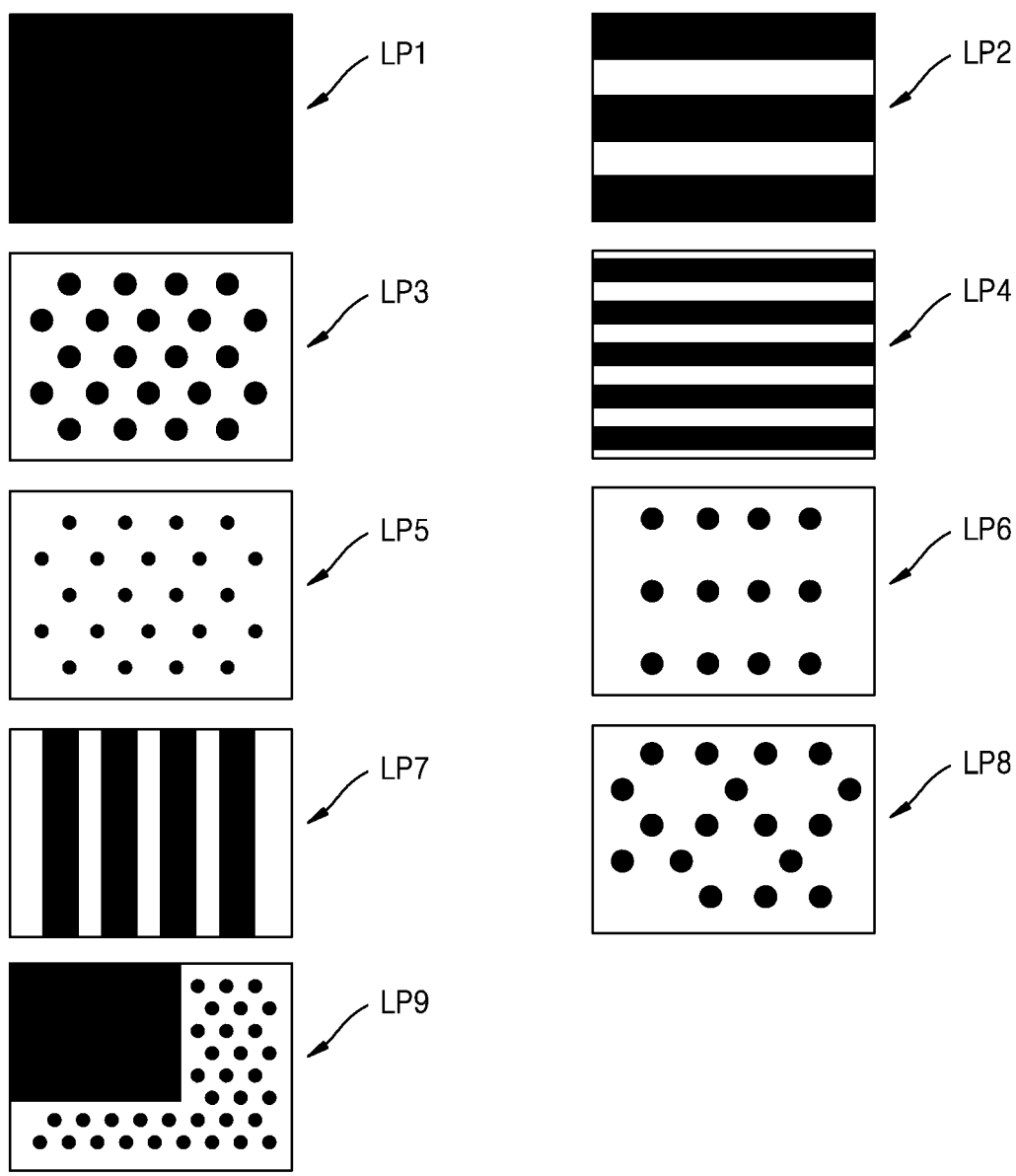
FIG. 7 is a view for explaining a light pattern of emission light of a depth sensor according to an embodiment of the disclosure.

FIG. 7 is a view for explaining a light pattern (LP) of emission light of a depth sensor according to an embodiment of the disclosure.

The pattern of emission light may be defined by an area irradiated by light for depth sensing within the front area. For example, a light pattern may indicate a region irradiated by the emission light emitted by the light emission unit of the depth sensor on a clipping plane located at a specific distance from the AR device. For example, the light pattern may correspond to a pattern that represents an area irradiated by emission light on an FoV cross-section of the depth sensor. The pattern density of the emission light may be determined to be a ratio of an area of the clipping plane of the depth sensor to the total area of the region irradiated with emission light on the clipping plane of the depth sensor. For example, the pattern density of the emission light may correspond to a ratio between the front area of the AR device and an actual measurement area for measuring a depth value through the depth sensor.

A first light pattern LP1 shows a light pattern according to an embodiment of radiating emission light to the entire FoV of the depth sensor. When radiating emission light having the first light pattern LP1, the AR device may generate a depth map having depth information for all pixels by using only the depth sensor.

A second light pattern LP2, a fourth light pattern LP4, and a seventh light pattern LP7 show light patterns each having a shape of a plurality of lines. Similar light patterns to the second light pattern LP2, the fourth light pattern LP4, and the seventh light pattern LP7 may be created when a similar light source module to the light source module EA1 shown in FIG. 6A supplies power to only some pads P or adjusts the refractive index of a varifocal lens, which will be described later, in a one-dimensional manner.

A third light pattern LP3, a fifth light pattern LP5, and a sixth light pattern LP6 show light patterns of which pattern densities are reduced from the first light pattern LP1 according to a constant rule. Similar light patterns to the third light pattern LP3, the fifth light pattern LP5, and the sixth light pattern LP6 may be created when controlling an on/off state of an emitter E included in the light emission unit or adjusting the refractive index of the varifocal lens, which will be described later, in a 2D manner.

An eighth light pattern LP8 shows a light pattern of which a pattern density is reduced from the first light pattern LP1 without special rules. A similar light pattern to the eighth light pattern LP8 may be created when controlling an on/off state of the emitter E included in the light emission unit.

A ninth light pattern LP9 shows a light pattern according to an embodiment in which a FoV portion of the depth sensor is entirely irradiated with emission light and the other portion is irradiated with emission light having a reduced pattern density. A similar light pattern to the ninth light pattern LP9 may be created when controlling the varifocal lens, which will be described later with reference to FIG. 10.

The light patterns and the generation methods thereof shown in FIG. 7 correspond to an embodiment of the disclosure, and thus embodiments of the disclosure are not limited thereto. Emission light beams of other various patterns may be created using other various methods. For example, a specific light pattern may be created from various combinations of individual adjustment of an on/off state or intensity of an emitter E and adjustment of a varifocal lens or an LCM.

Figure 8:
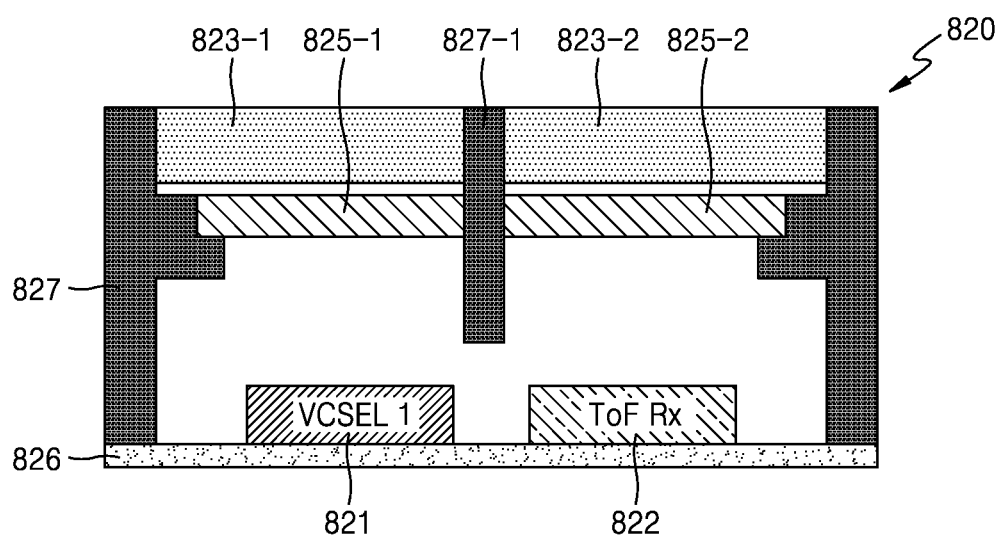
FIG. 8 is a cross-sectional view of a depth sensor according to an embodiment of the disclosure.

FIG. 8 is a cross-sectional view of a depth sensor 820 according to an embodiment of the disclosure.

Referring to FIG. 8, the depth sensor 820 may include a light emission unit 821, a light detection unit 822, first and second varifocal lenses 823-1 and 823-2, first and second optical units 825-1 and 825-2, a substrate 826, and a housing 827. All of the components illustrated in FIG. 8 are not essential components of the depth sensor 820. More or less components than those illustrated in FIG. 8 may constitute the depth sensor 820. The light emission unit 821, the light detection unit 822, the first and second optical units 825-1 and 825-2, the substrate 826, and the housing 827 of FIG. 8 may correspond to the light emission unit 421, the light detection unit 422, the first and second optical units 425-1 and 425-2, the substrate 426, and the housing 427 of FIG. 4, respectively.

The first and second varifocal lenses 823-1 and 823-2 are lenses having variable focuses, and may be used in an operation of controlling a light pattern of emission light. For example, the first and second varifocal lenses 823-1 and 823-2 may include a liquid crystal (LC) lens, a liquid membrane lens, an electrowetting lens, or an Alvarez lens. For example, the first and second varifocal lenses 823-1 and 823-2 may be implemented in such a form that a flexible plastic membrane surrounds a transparent fluid. The fluid within the first and second varifocal lenses 823-1 and 823-2 moves according to an electrical signal applied to the first and second varifocal lenses 823-1 and 823-2, and thus refractive indexes (diopter) of the first and second varifocal lenses 823-1 and 823-2 may be changed.

Referring to FIG. 8, a varifocal lens may include the first varifocal lens 823-1 and the second varifocal lens 823-2. According to an embodiment of the disclosure, emission light emitted by the depth sensor 820 may be emitted from the light emission unit 821 to the front area of the AR device through the first varifocal lens 823-1. Accordingly, by changing the refractive index of the first varifocal lens 823-1, the light pattern of the emission light emitted by the light emission unit 821 may be adjusted, and thus may be output to the front area. According to an embodiment of the disclosure, the light emission unit 821 may emit light having a pattern that is not consistent with a light pattern required by an application. At this time, by controlling the first varifocal lens 823-1, the light pattern of the emission light to be finally emitted to the outside of the AR device may be adjusted to be consistent with the light pattern required by the application.

According to an embodiment of the disclosure, reflection light reflected by an object may be received by the light detection unit 822 through the second varifocal lens 823-2. Thus, by changing the refractive index of the second varifocal lens 823-2, the reflection light may be collected to the light detection unit 822, and light collection efficiency of the light detection unit 822 may be increased.

According to an embodiment of the disclosure, the second varifocal lens 823-2 corresponding to the light detection unit 822 may be omitted. For example, the varifocal lens may be used in only an operation of adjusting the pattern of emission light. When the second varifocal lens 823-2 corresponding to the light detection unit 822 is omitted, reflection light obtained by reflection of the emission light by at least one object may pass through at least one of the housing 827, which is transparent, or the second optical unit 825-2 and may be received by the light detection unit 822.

According to an embodiment including the second varifocal lens 823-2, the first optical unit 823-1 and the second optical unit 823-2 may be separately constructed as shown in FIG. 8 or may be implemented as a single continuous component.

Figure 9:
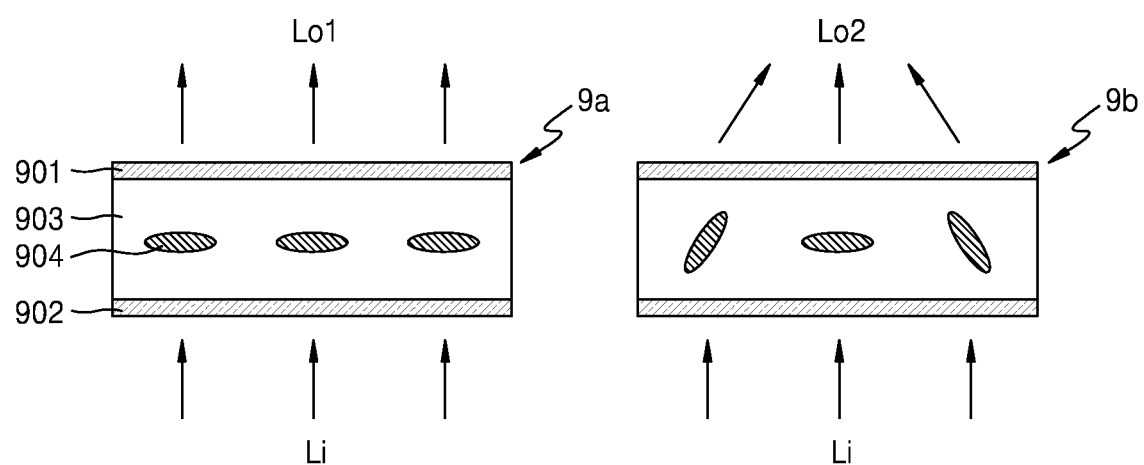
FIG. 9 is a view for explaining an operation, performed by a depth sensor according to an embodiment of the disclosure, of determining a light pattern of emission light.

FIG. 9 is a view for explaining an operation, performed by a depth sensor according to an embodiment of the disclosure, of determining a light pattern of emission light.

Varifocal lenses 9a and 9b are lenses having variable focuses. For example, the varifocal lenses 9a and 9b may include an LC lens, a liquid membrane lens, an electrowetting lens, or an Alvarez lens. For example, the LC lens is a lens having a variable refractive index that is controlled by an electrical signal.

Referring to FIG. 9, each of the varifocal lenses 9a and 9b may include an upper electrode 901, a lower electrode 902, and an LC layer 903. The LC layer 903 may be arranged between the upper electrode 901 and the lower electrode 902 and may include a plurality of microlenses 904. Although the LC layer 903 includes three microlenses 904 in FIG. 9 for convenience of explanation, the LC layer 903 may include a plurality of microlenses 904.

Each of the upper electrode 901 and the lower electrode 902 may be constructed as a transparent electrode capable of transmitting light. In particular, the upper electrode 901 and the lower electrode 902 may be constructed such that emission light generated by a light emission unit of the depth sensor passes through the upper electrode 901 and the lower electrode 902. For example, the upper electrode 901 and the lower electrode 902 may be constructed as a transparent indium tin oxide (ITO) electrode. However, embodiments of the disclosure are not limited thereto.

According to an embodiment of the disclosure, a voltage equal to or greater than a preset threshold value or greater may be applied between the upper electrode 901 and the lower electrode 902. In this case, an arrangement of the plurality of microlenses 904 within the LC layer 903 arranged between the upper electrode 901 and the lower electrode 902 may change, and the refractive index of the LC layer 903 may be changed. In other words, a focal length of the LC layer 903 may be changed.

Referring to FIG. 9, when no voltage or a voltage less than a threshold value is applied between the upper electrode 901 and the lower electrode 902 of the varifocal lens 9a, the arrangement of the microlenses 904 does not change, and thus light Li input to the varifocal lens 9a may pass through the varifocal lens 9a without changes and may be output (Lo1). When a voltage equal to or greater than the threshold value is applied between the upper electrode 901 and the lower electrode 902 of the varifocal lens 9a, the arrangement of the microlenses 904 changes, and thus light Li input to the varifocal lens 9b may be changed in focus and direction and may be output (Lo2).

As shown in FIG. 9, the AR device according to an embodiment of the disclosure may adjust the light pattern of the emission light for depth sensing of the front area of the AR device by adjusting the voltage applied between the upper electrode 901 and the lower electrode 902 of the varifocal lenses 9a and 9b included in the depth sensor.

Figure 10:
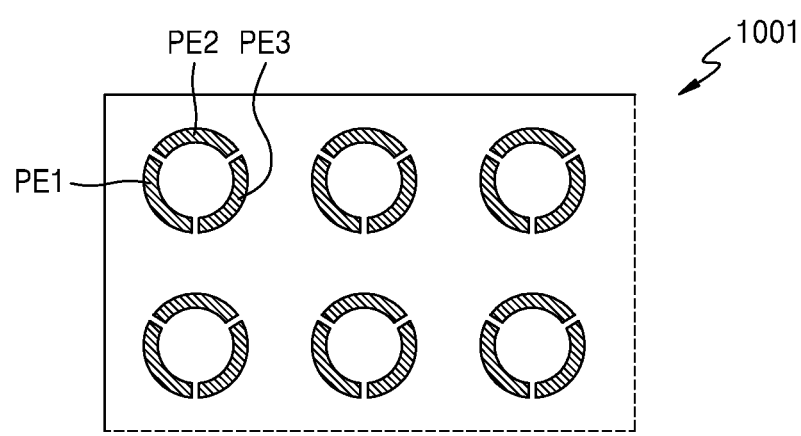
FIG. 10 is a view for explaining a varifocal lens of a depth sensor according to an embodiment of the disclosure.
Figure 10:
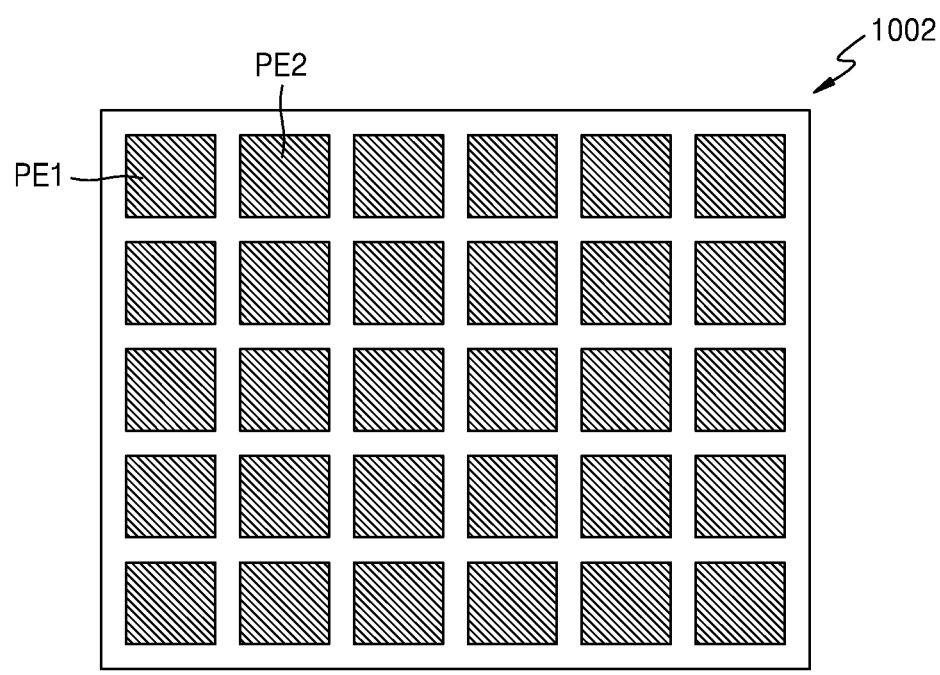
Figure 11:
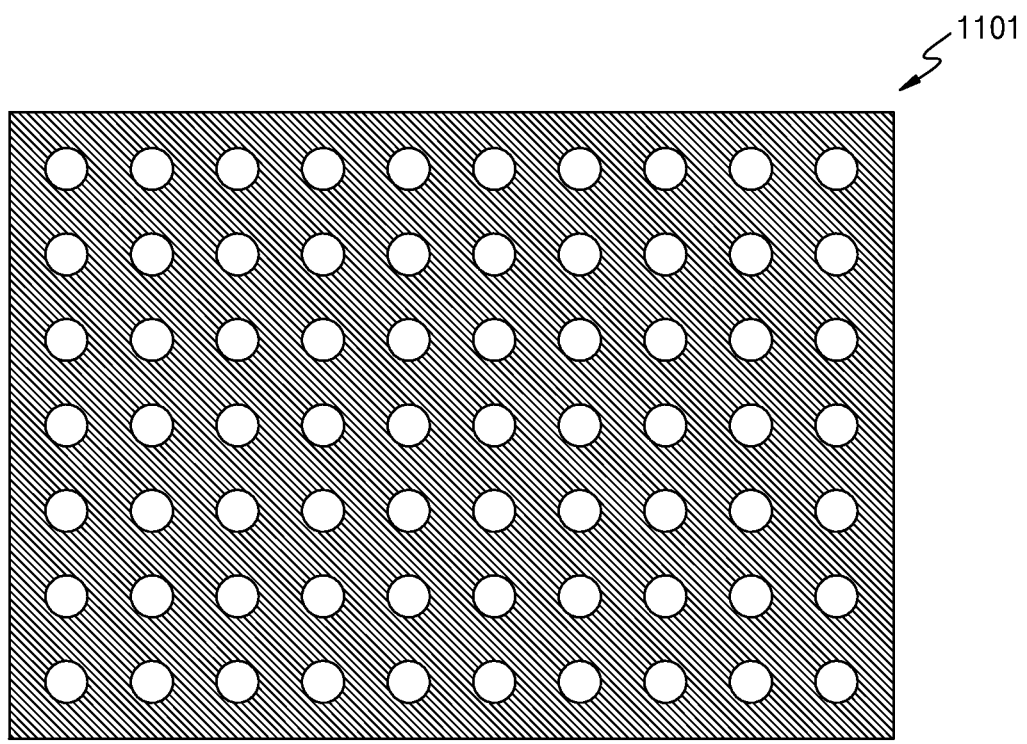
FIG. 11 is a view for explaining a varifocal lens of a depth sensor according to an embodiment of the disclosure.

FIGS. 10 and 11 are views for explaining a varifocal lens of a depth sensor according to an embodiment of the disclosure.

FIGS. 10 and 11 illustrate electrodes 1001, 1002, and 1101 in a varifocal lens according to an embodiment of the disclosure. The electrodes 1001, 1002, and 1101 of FIG. 10 or 11 are applicable to the upper electrode 901 or the lower electrode 902 of FIG. 9.

Referring to FIG. 10, an electrode of the varifocal lens may include a plurality of electrode units PE1, PE2, and PE3. The plurality of electrode units PE1, PE2, and PE3 may have various shapes. According to an embodiment of the disclosure, some of the plurality of electrode units PE1, PE2, and PE3 may be short-circuited to have the same potential, and all of the plurality of electrode units PE1, PE2, and PE3 may be insulated from one another. According to an embodiment of the disclosure, when different voltages are applied to the plurality of electrode units PE1, PE2, and PE3 insulated from one another, different electric fields may be applied to different portions of the LC layer 903 of FIG. 9 of the varifocal lens. In other words, according to an embodiment of the disclosure, varifocal lens may generate electric fields of various patterns according to the pattern (determined according to the number of electrode units, the shapes thereof, and a layout thereof) of an electrode, and may adjust emission light transmitted by the varifocal lens to have various patterns. As in FIG. 10, when each of the electrodes 1001 and 1002 of the varifocal lens include the plurality of electrode units PE1, PE2, and PE3 capable of applying different voltages, the pattern of the emission light may be precisely controlled for each pixel.

Referring to FIG. 11, the electrode 1101 of the varifocal lens may be constructed with a single electrode unit. In this case, the electrode 1101 may have the same potential at all points within the electrode 1101. The electrode 1101 of the varifocal lens may be shaped in various patterns. The varifocal lens may generate electric fields of various patterns according to the pattern of the electrode 1101, and may adjust emission light transmitted by the varifocal lens to have various patterns.

Figure 12:
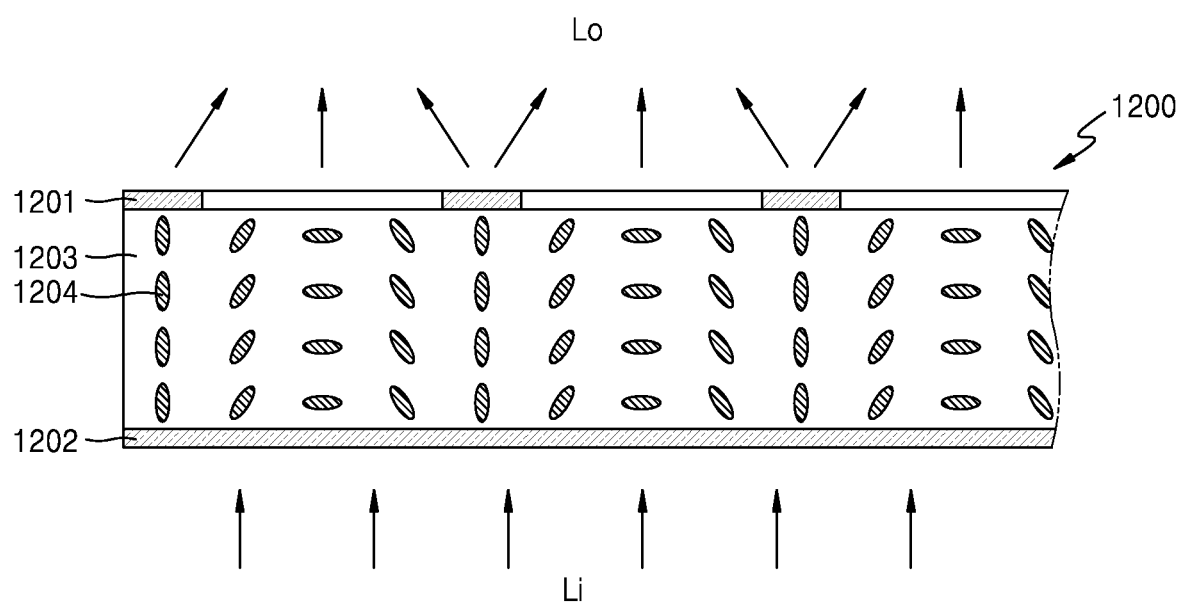
FIG. 12 is a view for explaining an operation, performed by a depth sensor according to an embodiment of the disclosure, of determining a light pattern of emission light.

FIG. 12 is a view for explaining an operation, performed by a depth sensor according to an embodiment of the disclosure, of determining a light pattern of emission light.

FIG. 12 illustrates a varifocal lens 1200 including the electrode 1101 of FIG. 11 as an upper electrode 1201. Referring to FIG. 12, the varifocal lens 1200 may include the upper electrode 1201, a lower electrode 1202, an LC layer 1203, and a plurality of microlenses 1204. The upper electrode 1201, the lower electrode 1202, the LC layer 1203, and the microlens 1204 of FIG. 12 may respectively correspond to the upper electrode 901, the lower electrode 902, the LC layer 903, and the microlens 904 of FIG. 9.

According to an embodiment of the disclosure, a voltage equal to or greater than a threshold value may be applied between the lower electrode 1202 and the upper electrode 1201 shaped in a specific pattern. In this case, an arrangement of the plurality of microlenses 1204 within the LC layer 1203 arranged between the upper electrode 1201 and the lower electrode 1202 may be changed, and the refractive index of the LC layer 1203 may be changed. In other words, a focal length of the LC layer 1203 may be changed.

As shown in FIG. 12, the AR device according to an embodiment of the disclosure may variously adjust the light pattern of the emission light emitted by the depth sensor, by adjusting the pattern of the upper electrode 1201 of the varifocal lens 1200 included in the depth sensor and the voltage applied between the upper electrode 1201 and the lower electrode 1202.

Figure 13:
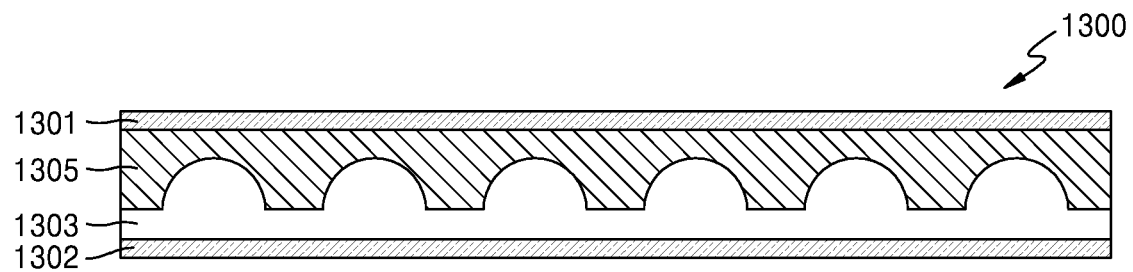
FIG. 13 is a view for explaining a varifocal lens of a depth sensor according to an embodiment of the disclosure.

FIG. 13 is a view for explaining a varifocal lens 1300 of a depth sensor according to an embodiment of the disclosure.

Referring to FIG. 13, the varifocal lens 1300 may include an upper electrode 1301, a lower electrode 1302, an LC layer 1303, and a polymer layer 1305. The upper electrode 1301, the lower electrode 1302, and the LC layer 1303 of FIG. 13 may respectively correspond to the upper electrode 901, the lower electrode 902, and the LC layer 903 of FIG. 9. The LC layer 1303 of FIG. 13 may include a plurality of microlenses.

The varifocal lens 1300 may adjust light collection characteristics of the varifocal lens 1300 by adjusting a refractive index distribution within the LC layer 1303 by using the patterned upper and lower electrodes 1301 and 1302 or a curved structure formed on the surface of a substrate. Referring to FIG. 13, when the varifocal lens 1300 includes the polymer layer 1305 arranged over the LC layer 1303, the light collection characteristics of the varifocal lens 1300 may be additionally adjusted according to the pattern of a boundary surface between the LC layer 1303 and the polymer layer 1305.

According to an embodiment of the disclosure, the varifocal lens 1300 including the LC layer 1303 and the polymer layer 1305 may determine the light pattern of emission light emitted after passing through the varifocal lens 1300, based on the arrangement of the microlenses within the LC layer 1303, the pattern of the boundary surface between the LC layer 1303 and the polymer layer 1305, and the refractive index of the polymer layer 1305, by adjusting a voltage applied to the LC layer 1303 through an electrode unit of the upper electrode 1301 or the lower electrode 1302.

Figure 14:
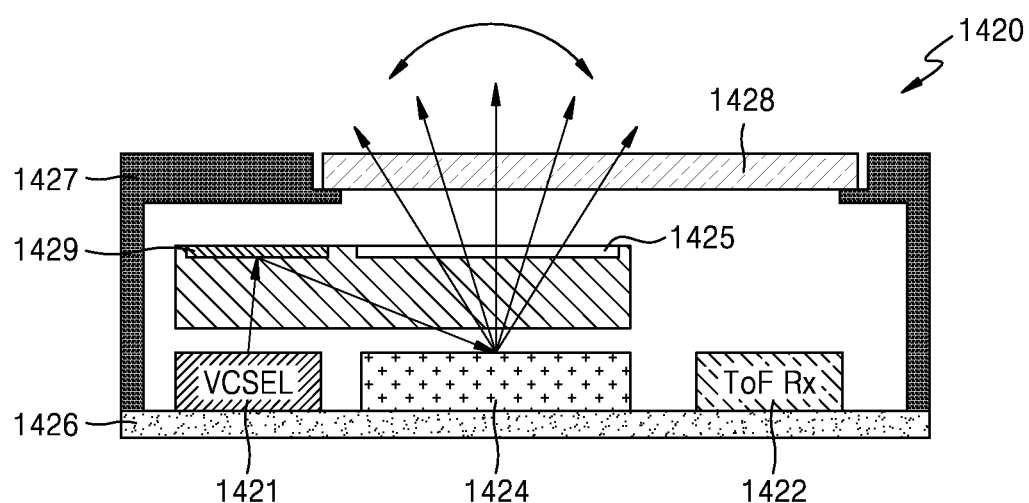
FIG. 14 is a cross-sectional view of a depth sensor according to an embodiment of the disclosure.

FIG. 14 is a cross-sectional view of a depth sensor 1420 according to an embodiment of the disclosure.

Referring to FIG. 14, the depth sensor 1420 may include a light emission unit 1421, a light detection unit 1422, an LCM 1424, an optical unit 1425, a substrate 1426, a housing 1427, a cover window 1428, and a reflection plate 1429. All of the components illustrated in FIG. 14 are not essential components of the depth sensor 1420. More or less components than those illustrated in FIG. 14 may constitute the depth sensor 1420. The light emission unit 1421, the light detection unit 1422, the optical unit 1425, the substrate 1426, and the housing 1427 of FIG. 14 may correspond to the light emission unit 421, the light detection unit 422, the first and second optical units 425-1 and 425-2, the substrate 426, and the housing 427 of FIG. 4, respectively.

The LCM 1424 is a mirror capable of controlling the trajectory of reflected light, and may be used in an operation of controlling the light pattern of emission light in an embodiment of the disclosure. For example, the LCM 1424 may include a meta-surface material using nano particles. The depth sensor 1420 may control optical characteristics of light incident upon the LCM 1424, based on an electrical signal applied to the LCM 1424. For example, the depth sensor 1420 may adjust the amplitude and phase of reflection light through the LCM 1424, and may adjust a direction or wavefront of the incident light in a desired form.

According to an embodiment of the disclosure, emission light emitted by the depth sensor 1420 may be emitted from the light emission unit 1421, reflected by the LCM 1424, and emitted to the front area of the AR device. Accordingly, by controlling the LCM 1424, the depth sensor 1420 may adjust the light pattern of the emission light emitted by the light emission unit 1421 and thus output the emission light having the adjusted light pattern to the front area. According to an embodiment of the disclosure, the light emission unit 1421 may emit light having a pattern that is not consistent with a light pattern required by an application. At this time, by controlling the LCM 1424, the light emission unit 1421 may adjust the light pattern of the emission light to be finally emitted to the outside of the AR device to be consistent with the light pattern required by the application.

The cover window 1428 may be formed of a transparent material so that the emission light is emitted to the outside of the depth sensor 1420. According to an embodiment of the disclosure, the cover window 1428 may include a function of the optical unit 1425. According to an embodiment of the disclosure, when the housing 1427 is formed of a transparent material such as a CMC, the cover window 1428 may be omitted.

The reflection plate 1429 may change the direction of light emitted by the light emission unit 1421 so that the light emitted by the light emission unit 1421 is incident upon the LCM 1424. According to an embodiment of the disclosure, the reflection plate 1429 may be constructed with an LCM.

According to an embodiment of the disclosure, the depth sensor 1420 may include both a varifocal lens and the LCM 1424. In this case, the varifocal lens may be arranged at any location on a path through which the light emitted by the light emission unit 1421 passes inside the depth sensor 1420, for example, the varifocal lens may be arranged between the light emission unit 1421 and the reflection plate 1429, or between the optical unit 1425 and the cover window 1428, or at a location of the cover window 1428.

Figure 15:
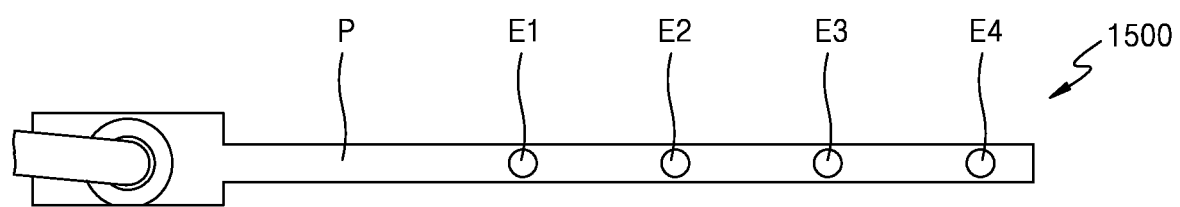
FIG. 15 is a view for explaining a light emission unit of a depth sensor according to an embodiment of the disclosure.

FIG. 15 is a view for explaining a light emission unit 1500 of a depth sensor including an LCM, according to an embodiment of the disclosure.

The light emission unit 1500 of the depth sensor including an LCM may have a shape in which a plurality of emitters E1, E2, E3, and E4 are aligned with one another in a line. According to an embodiment of the disclosure, an emitter E may include a point light source laser (for example, a VCSEL) that generates emission light having a point pattern. According to an embodiment of the disclosure, the AR device may control the light pattern of the emission light emitted by the light emission unit 1500 by controlling an operation of at least one emitter E included in the light emission unit 1500. According to an embodiment of the disclosure, emitters E included in the light emission unit 1500 may be connected to each other in units of a preset number of emitters. In this case, the AR device may control the light emission unit 1500 of the depth sensor by controlling operations of the emitters E in units of a preset number of emitters E.

Referring to FIG. 15, according to an embodiment of the disclosure, the light emission unit 1500 may include four emitters E. The four emitters E may be arranged in a line array. The emitters E included in the light emission unit 1400 may be connected to one pad P, or may be connected to different pads, respectively. The emitters E may be provided with power through the pad P. Accordingly, when the emitters E included in the light emission unit 1400 are connected to one pad P, on/off states of all of the emitters E may be equally controlled, and, when a plurality of emitters E are connected to different pads P, respectively, the respective on/off states of the emitters E or the intensities of light beams emitted by the emitters E may be differently controlled.

Figure 16:
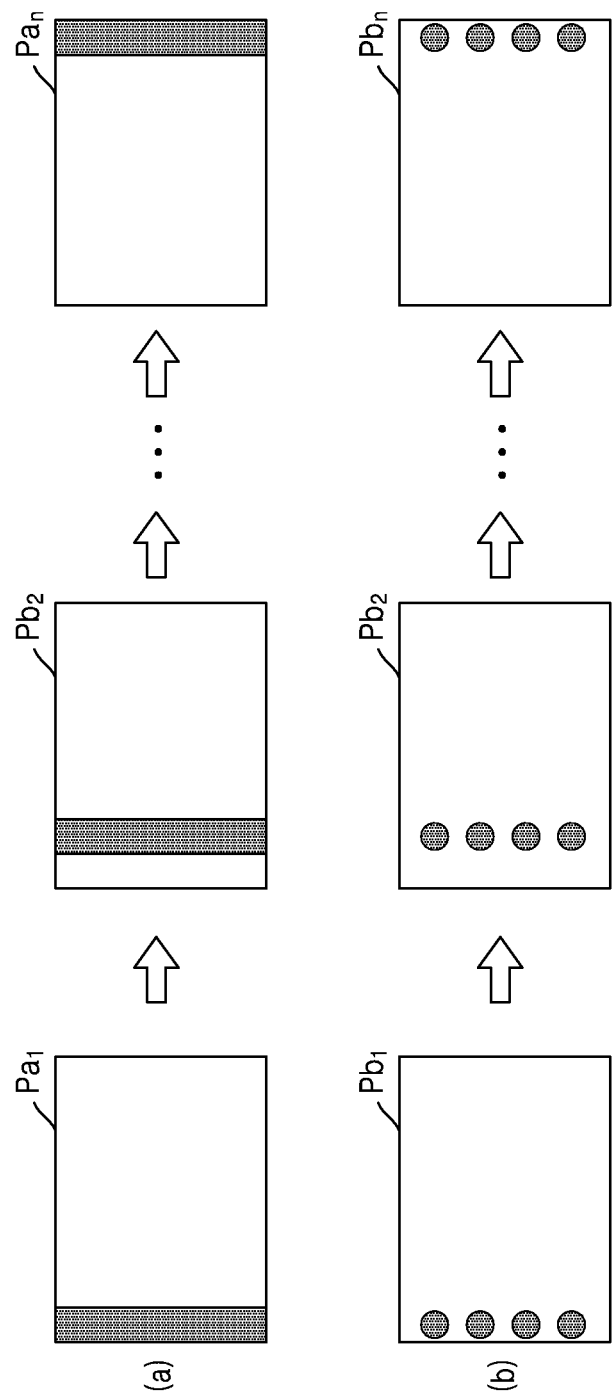
FIG. 16 is a view for explaining the light pattern of emission light of a depth sensor according to an embodiment of the disclosure.

FIG. 16 is a view for explaining the light pattern of emission light of a depth sensor according to an embodiment of the disclosure.

FIG. 16 illustrates an embodiment in which the light emission unit 1500 of FIG. 15 is applied to the light emission unit 1421 in the depth sensor 1420 of FIG. 14. Referring back to FIGS. 14 and 15, the line-shaped emission light emitted by the light emission unit 1421 may be reflected by the reflection plate 1429 and then may be incident upon the LCM 1424. The LCM 1424 may change a reflection angle in each sub-frame of a constant time interval. For example, referring to FIG. 16, at a time $t_1$, emission light reflected by the LCM 1424 and emitted to the outside of the depth sensor 1420 may irradiate a left end portion within the FoV of the depth sensor 1420. At a time $t_2$, which is a next sub-frame, the LCM 1424 may change the reflection angle to allow the emission light to irradiate a right side, compared with the case at the time $t_1$. The LCM 1424 may continuously change the reflection angle to adjust the emission light to irradiate a right end portion within the FoV of the depth sensor 1420 at a time $t_n$, which is an n-th sub-frame. After scanning within the entire FoV of the depth sensor 1420 as described above is completed, the LCM 1424 may be adjusted to have a reflection angle as at a time $t_{n-1}$ and the time $t_1$. In this case, a time interval from $t_1$ to $t_n$ may be referred to as a scanning period of the depth sensor 1420 or as a sensing frame.

Referring to FIG. 16, emission light may have various patterns Pa and Pb. According to an embodiment of the disclosure, when the pattern of the emission light is changed from (a) to (b), the depth sensor 1420 may adjust the reflection angle of the LCM 1424 in a 2D manner. For example, the depth sensor 1420 may adjust the path of emission light for each pixel by changing a reflection angle on a y-axis, separately from an operation of changing a reflection angle on an x-axis in order to move a location irradiated by the emission light, thereby adjusting the focal point of the emission light. When the depth sensor 1420 includes a varifocal lens, the varifocal lens may be used in an operation of changing the pattern of the emission light from (a) to (b).

According to an embodiment of the disclosure, a rolling shutter type sensor having the same scanning period and the same sub-frame interval as the LCM 1424 is applicable to the light detection unit 1422 of the depth sensor 1420 using emission light as in FIG. 16.

Figure 17:
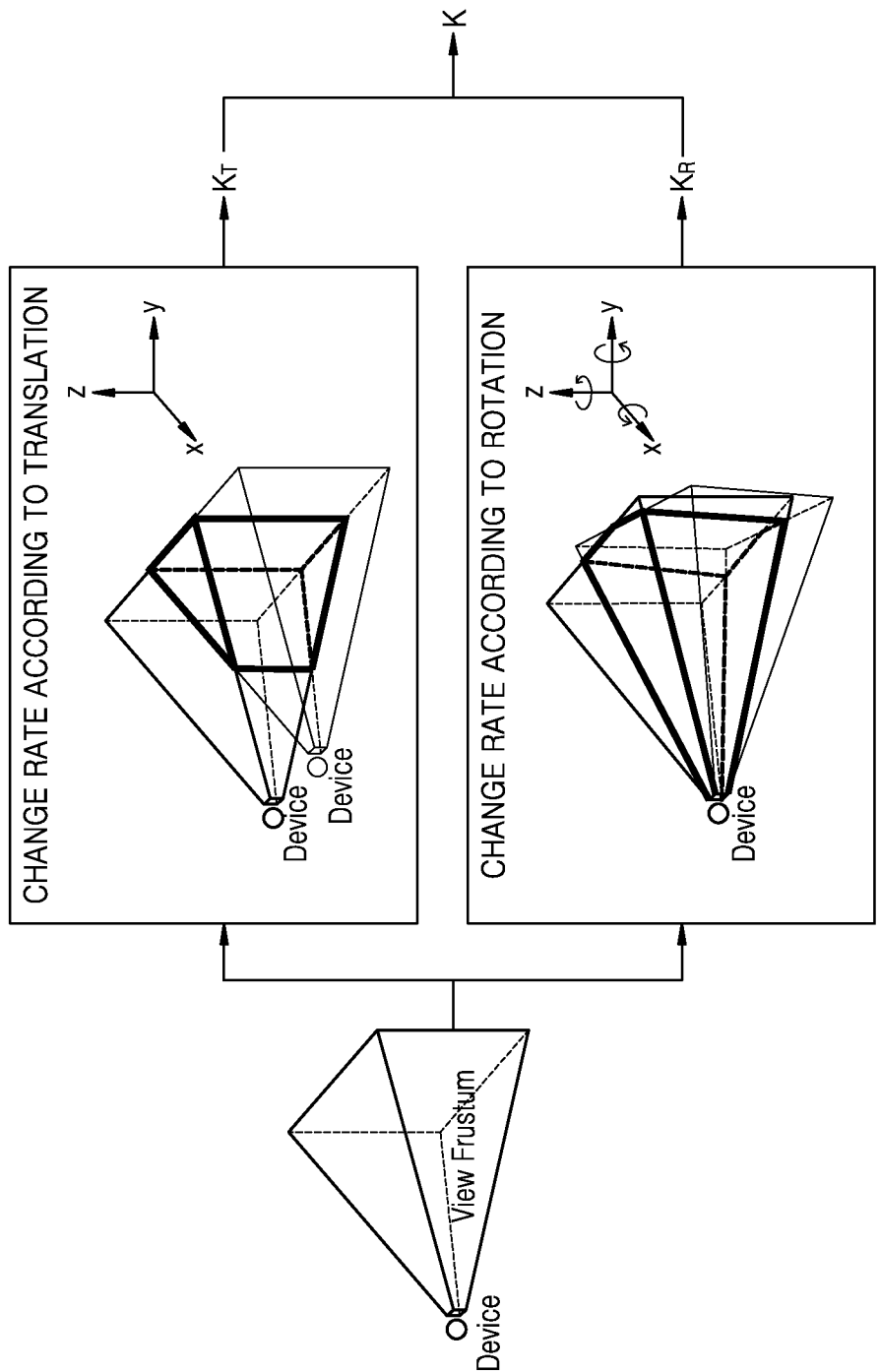
FIG. 17 is a view for explaining an operation of sensing a motion of an AR device according to an embodiment of the disclosure.

FIG. 17 is a view for explaining an operation of sensing a motion of an AR device according to an embodiment of the disclosure.

The AR device according to an embodiment of the disclosure may detect a movement by using a motion sensor such as an IMU sensor. Referring to FIG. 17, movements of the AR device may be classified into a movement according to a translation and a movement according to a rotation. A change rate K of the front area (scene, the FoV of the depth sensor) according to a movement of the AR device may be determined as a value obtained by multiplying a change rate $K_T$ according to a translation by a change rate $K_R$ according to a rotation. According to an embodiment of the disclosure, the AR device may determine that there is a movement of the AR device, and a depth map needs to be re-generated or a depth sensor needs to be controlled, in case that the change rate K of the front area exceeds a preset threshold value.

The AR device according to an embodiment of the disclosure may change the light pattern of the emission light to be emitted by the depth sensor, change the intensity of the emission light, or change an operation period (frame rate) of the depth sensor, by identifying the activity of the user wearing the AR device, based on the detected movement.

Figure 18:
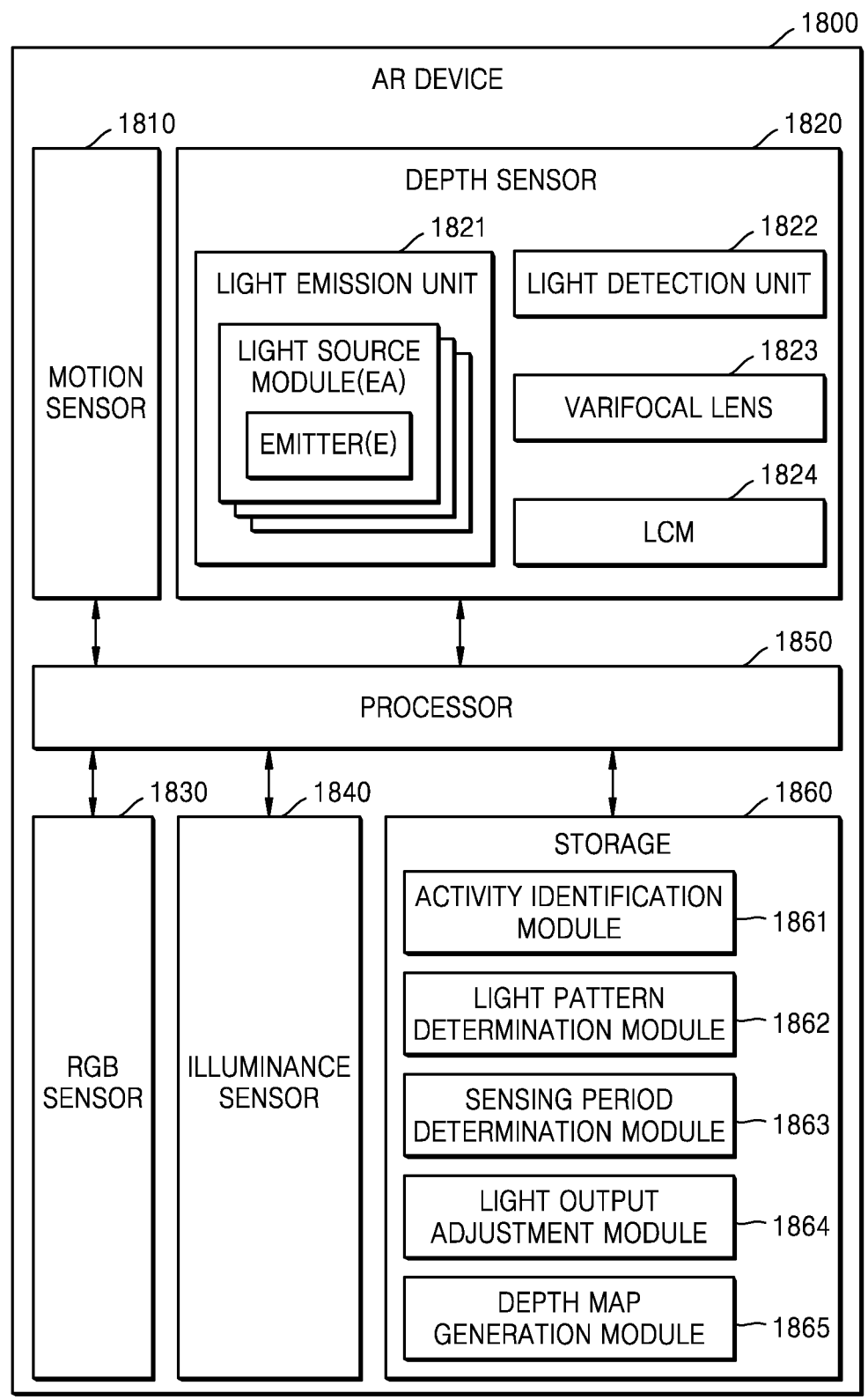
FIG. 18 is a block diagram of an AR device according to an embodiment of the disclosure.

FIG. 18 is a block diagram of an AR device 1800 according to an embodiment of the disclosure.

Referring to FIG. 18, the AR device 1800 may include a motion sensor 1810, a depth sensor 1820, an RGB sensor 1830, an illuminance sensor 1840, a processor 1850, and a storage 1860. The depth sensor 1820 may include a light emission unit 1821 including at least one of a light source module EA or an emitter E, a light detection unit 1822, a varifocal lens 1823, and an LCM 1824. All of the components illustrated in FIG. 18 are not essential components of the AR device 1800. More or less components than those illustrated in FIG. 18 may constitute the AR device 1800.

The motion sensor 1810 of FIG. 18 may correspond to the motion sensor 310 of FIG. 3 described above. The depth sensor 1820 of FIG. 18 may correspond to the depth sensor 320 of FIG. 3 described above. In particular, the light emission unit 1821 of FIG. 18 may correspond to the light emission unit 321 of FIG. 3, and the light detection unit 1822 of FIG. 18 may correspond to the light detection unit 322 of FIG. 3. The processor 1850 of FIG. 18 may correspond to the processor 350 of FIG. 3 described above. The RGB sensor 1830 of FIG. 18 may correspond to the RGB sensor 330 of FIG. 3 described above. The storage 1860 of FIG. 18 may correspond to the storage 360 of FIG. 3 described above.

The variable focus (varifocal) lens 1823 is a lens having a variable focus, and may be used in an operation of controlling a light pattern of emission light. For example, the varifocal lens 1823 may include an LC lens, a liquid membrane lens, an electrowetting lens, or an Alvarez lens. For example, the varifocal lens 1823 may be implemented in such a form that a flexible plastic membrane surrounds a transparent fluid. The fluid within the varifocal lens 1823 moves according to an electrical signal applied to the varifocal lens 1823, and thus a refractive index (diopter) of the varifocal lens 1823 may be changed.

As described above with reference to FIG. 8, emission light emitted by the depth sensor 1820 including the varifocal lens 1823 may be emitted from the light emission unit 1821 toward a front area of the AR device 1800 through the varifocal lens 1823. Accordingly, by changing the refractive index of the varifocal lens 1823, the light pattern of the emission light emitted by the light emission unit 1821 may be adjusted, and thus may be output to the front area. According to an embodiment of the disclosure, the light emission unit 1821 may emit light having a pattern that is not consistent with a light pattern required by an application. At this time, by controlling the varifocal lens 1823, the light pattern of the emission light to be finally emitted to the outside of the AR device 1800 may be adjusted to be consistent with the light pattern required by the application.

The LCM 1824 is a mirror capable of controlling the trajectory of reflected light, and may be used in an operation of controlling the light pattern of emission light. For example, the LCM 1824 may include a meta-surface material using nano particles. The depth sensor 1820 may control optical characteristics of light incident upon the LCM 1824, based on an electrical signal applied to the LCM 1824. For example, the depth sensor 1820 may adjust the amplitude and phase of reflection light through the LCM 1824, and may adjust a direction or wavefront of the incident light in a desired form.

As described above with reference to FIG. 14, emission light emitted by the depth sensor 1820 including the varifocal lens 1824 may be emitted from the light emission unit 1821, reflected by the LCM 1824, and emitted toward the front area of the AR device 1800. Accordingly, by controlling the LCM 1824, the depth sensor 1820 may adjust the light pattern of the emission light emitted by the light emission unit 1821 and thus output the emission light having the adjusted light pattern to the front area. According to an embodiment of the disclosure, the light emission unit 1821 may emit light having a pattern that is not consistent with the light pattern required by the application. At this time, by controlling the LCM 1824, the light emission unit 1821 may adjust the light pattern of the emission light to be finally emitted to the outside of the AR device 1800 to be consistent with the light pattern required by the application.

An operation, performed by the AR device 1800 according to an embodiment of the disclosure, of adjusting a light pattern of emission light emitted by the ToF type depth sensor 1820 is not limited to the operations according to the above-described embodiments, and may be implemented in various ways.

The illuminance sensor 1840 may obtain surrounding environment information, in particular, brightness information, of the AR device 1800. The illuminance sensor 1840 may include a device having a photoelectric effect in which conductivity is changed due to generation of electrons moving inside when light energy (light) is received. The illuminance sensor 1840 may determine the degree of lightness and darkness by using a conductivity that varies according to the amount of ambient light, and may obtain ambient brightness information of the AR device 1800.

The programs stored in the storage 1860 may be classified into a plurality of modules according to their functions. For example, the storage 1860 may further include a sensing period (frame rate) determination module 1863 and a light output adjustment module 1864 in addition to the activity identification module 1861, the light pattern determination module 1862, and the depth map generation module 1865. The activity identification module 1861 of FIG. 18 may correspond to the activity identification module 361 of FIG. 3 described above. The light pattern determination module 1862 of FIG. 18 may correspond to the light pattern determination module 362 of FIG. 3 described above. The depth map generation module 1865 of FIG. 18 may correspond to the depth map generation module 365 of FIG. 3 described above.

According to an embodiment of the disclosure, the processor 1850 may execute one or more instructions of the sending period determination module 1863 from among the programs stored in the storage 1860 to determine the sensing period (frame rate) of the depth sensor 1820, based on the activity of the user and the location of the AR device 1800 identified based on the surrounding environment information of the AR device 1800. According to an embodiment of the disclosure, the light emission unit 1821 may emit emission light having a pulse form, and the processor 1850 may determine the period (frame rate) of the emission light having a pulse form. As the emission period of the emission light decreases, battery consumption may be reduced. According to an embodiment of the disclosure, the processor 1850 may lengthen the sensing frame rate of the depth sensor 1820 in order to reduce power consumption.

According to an embodiment of the disclosure, the processor 1850 may execute one or more instructions of the light output adjustment module 1864 from among the programs stored in the storage 1860 to determine the light intensity of the emission light to be emitted by the depth sensor 1820, based on the activity of the user and the location of the AR device 1800 identified based on the surrounding environment information of the AR device 1800. According to an embodiment of the disclosure, the processor 1850 may adjust a light output of the emission light by adjusting the emission level of an emitter E included in the light emission unit 1821 of the depth sensor 1820. For example, when the emission level of the emitter E increases, a light output of the light emission unit 1821 including the emitter E increases, and the intensity of the emission light emitted by the depth sensor 1820 through the light emission unit 1821 increases. When the intensity of the emission light increases, the emission light may reach a greater distance, and thus a depth detection distance increases. When the intensity of the emission light decreases, the detection distance of the depth sensor 1820 may decrease, but power consumption of the AR device 1800 may be reduced. Accordingly, when there is a need to detect a farther depth, the light output of the light emitting unit 1821 may be increased, and, when there is a need to reduce power consumption even when only a near depth is detected, the light output may be reduced. As such, the processor 1850 may determine the intensity of the emission light, based on a required depth detection distance and a required power consumption degree, by adjusting the light output.

Figure 19:
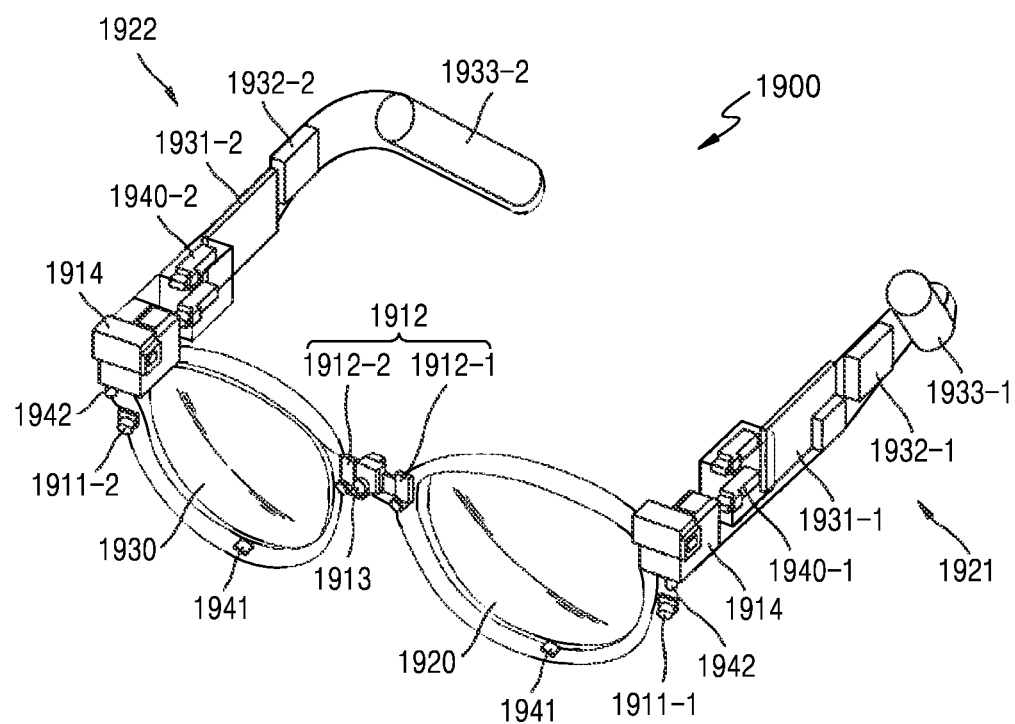
FIG. 19 is a perspective view of an AR device according to an embodiment of the disclosure.

FIG. 19 is a perspective view of an AR device 1900 according to an embodiment of the disclosure.

FIG. 19 illustrates the AR device 1900 generating a depth map by controlling a depth sensor. The AR device 1900 may include, for example, AR glasses in the form of glasses worn by a user on his or her face, an HMD worn on his or her head, a VRH, or an AR helmet. The AR device 1900 may provide an extra-large screen to a user by arranging a display in front of the user's eyes, and may provide a realistic virtual world because the screen moves according to the user's movement.

According to an embodiment of the disclosure, the user may wear the AR device 1900 capable of displaying a visual extended reality content. The AR device 1900 may include an audio module capable of providing an audio extended reality content to the user. According to an embodiment of the disclosure, the AR device 1900 may include one or more cameras 1913 capable of capturing a surrounding image and a surrounding video. The AR device 1900 may include an eye tracking system in order to determine a vergence distance of the user. According to an embodiment of the disclosure, the AR device 1900 may include a light-weight HMD (for example, goggles, glasses, or a visor). According to an embodiment of the disclosure, the AR device 1900 may include a non-HMD device such as a light-weight portable display device or one or more laser-projecting glasses (for example, glasses capable of projecting a low-powered laser onto the user's retina in order to project and display an image or a depth content to the user).

According to an embodiment of the disclosure, the AR device 1900 may provide an AR service that outputs at least one virtual object such that the at least one virtual object is superimposed on an area determined as the FoV of the user. For example, the area determined as the FoV of the user is an area determined to be recognizable by the user wearing the AR device 1900 through the AR device 1900, and may include the entirety or at least a portion of the display of the AR device 1900. According to an embodiment of the disclosure, the AR device 1900 may include a plurality of transparent members, namely, first and second transparent members (e.g., displays 1920 and 1930), respectively corresponding to both eyes of the user.

According to an embodiment of the disclosure, the AR device 1900 may include a display module 1914, a camera 1913, an audio output unit, and supports 1921 and 1922.

The camera 1913 may capture an image corresponding to the user's FoV or measure a distance to an object. According to an embodiment of the disclosure, the camera 1913 may be used for head tracking and space recognition. The camera 1913 may recognize a movement of the user.

According to an embodiment of the disclosure, the camera may further include an eye tracking (ET) camera 1912 in addition to the camera 1913 used to detect an image corresponding to the user's FoV, that is, a movement of an object or to achieve space recognition. According to an embodiment of the disclosure, the ET camera 1912 may be used to detect and track the pupil of the user. The ET camera 1912 may be used to adjust the center of a virtual image projected on the AR device 1900 to be positioned according to the gaze direction of the pupil of the user wearing the AR device 1900. For example, a global shutter (GS) camera may be used as the ET camera 1912 to detect the pupil and track a rapid pupil movement without delay. The ET camera 1912 may separately include a left eye camera 1912-1 and a right eye camera 1912-2.

According to an embodiment of the disclosure, the display module 1914 may include a first display 1920 and a second display 1930. A virtual object output through the display module 1914 may include information related to an application program executed in the AR device 1900 or information related to an external object located in a real space corresponding to an area determined as the user's FoV. For example, the AR device 1900 may identify an external object included in at least a portion corresponding to the area determined as the user's FoV from among image information related to a real space obtained through the camera 1913. The AR device 1900 may output a virtual object related to the external object identified from the at least a portion through an area determined as the user's FoV from among the display area of the AR device 1900. The external object may include a thing existing in the real space.

According to an embodiment of the disclosure, the first and second displays 1920 and 1930 may include a condensing lens or a waveguide in a transparent member. For example, the transparent member may be formed of a glass plate, a plastic plate, or a polymer, and may be manufactured to be completely transparent or semi-transparent. According to an embodiment of the disclosure, the transparent member may include the first transparent member (e.g., the second display 1930) facing the right eye of the user wearing the AR device 1900 and the second transparent member (e.g., the first display 1920) facing the left eye of the user. When the display is transparent, the display may be disposed at a location facing the user's eyes to display the screen.

The waveguide may transmit light generated by a light source of the display to the user's eyes. For example, the waveguide may be at least partially positioned on a portion of the first and second transparent members (e.g., displays 1920 and 1930). According to an embodiment of the disclosure, the light emitted by the display may be incident on one end of the waveguide, and the incident light may be transmitted to the user's eyes through total internal reflection in the waveguide. The waveguide may be made of a transparent material such as glass, plastic, or polymer, and may include a nano-pattern formed on an inner or outer surface, for example, a polygonal or curved grating structure. According to an embodiment of the disclosure, the incident light may be propagated or reflected inside the waveguide according to the nano-pattern and provided to the user's eyes. According to an embodiment of the disclosure, the waveguide may include at least one of at least one diffractive element (e.g., a diffractive optical element (DOE) or a holographic optical element (HOE)) or a reflective element (e.g., a mirror). According to an embodiment of the disclosure, the waveguide may guide the display light emitted by the light source to the user's eyes by using at least one DOE or a reflective element.

According to an embodiment of the disclosure, the first and second displays 1920 and 1930 may include a display panel or a lens (for example, glass). For example, the display panel may include a transparent material such as glass or plastic. According to an embodiment of the disclosure, the display may be constructed with a transparent device, and the user may recognize a real space behind the display. The display may display the virtual object on at least a portion of the area of the transparent device so that the user sees the virtual object as being added to at least a portion of the real space.

According to an embodiment of the disclosure, the supports 1921 and 1922 may include printed circuit boards (PCBs) 1931-1 and 1931-2 for transmitting an electrical signal to each of the components of the AR device 1900, speakers 1932-1 and 1932-2 for outputting an audio signal, or batteries 1933-1 and 1933-2 for supplying power. For example, in the AR device 1900 of a glasses type, the supports 1921 and 1922 may be arranged on the temples of glasses. The supports 1921 and 1922 may include hinges 1940-1 and 1940-2 for joining the supports 1921 and 1922 to the main body of the AR device 1900. The speakers 1932-1 and 1932-2 may include a first speaker 1932-1 for transmitting an audio signal to the left ear of the user, and a second speaker 1932-2 for transmitting an audio signal to the right ear of the user.

Referring to FIG. 19, the AR device 1900 may include a microphone 1941 for receiving a user's voice and ambient sounds. The AR device 1900 may also include at least one illumination LED 1942 to increase the accuracy of at least one camera (for example, the ET camera 1912, the camera (outward camera) 1913, or recognition cameras 1911-1 and 1911-2). For example, the at least one illumination LED 1942 may be used as an auxiliary unit for increasing accuracy when photographing the user's pupil with the ET camera 1912, and the at least one illumination LED 1942 may use an IR LED having an infrared wavelength instead of a visible light wavelength. For example, the at least one illumination LED 1942 may be used as an auxiliary unit when subject detection is not easy due to a dark environment when photographing a user's gesture with the recognition cameras 1911-1 and 1911-2.

According to an embodiment of the disclosure, the display module 1914 may include a first light guide plate (e.g., first display 1920) corresponding to the left eye and a second light guide plate (e.g., second display 1930) corresponding to the right eye, and may provide visual information to the user through the first light guide plate (e.g., first display 1920) and the second light guide plate (e.g., second display 1930). According to an embodiment of the disclosure, the display module 1914 may include a display panel or a lens (for example, a glass lens or an LC lens). The display panel may include a transparent material such as glass or plastic.

According to an embodiment of the disclosure, the display module 1914 may be configured with a transparent device, and the user may recognize the real space behind the display module 1914 and in front of the user through the display module 1914. The display module 1914 may display the virtual object on at least a portion of the area of the transparent device so that the user sees the virtual object as being added to at least a portion of the real space.

According to an embodiment of the disclosure, the AR device 1900 may identify an external object included in at least a portion corresponding to the area determined as the user's FoV from among image information related to the real space obtained through the outward camera 1913. The AR device 1900 may output (or display) a virtual object related to the external object identified from the at least a portion through an area determined as the user's FoV from among the display area of the AR device 1900. The external object may include a thing existing in the real space. According to various embodiments, the display area on which the AR device 1900 displays the virtual object may include a portion (for example, at least a portion of the display panel) of the display module 1914. According to an embodiment of the disclosure, the display area may be an area corresponding to at least a portion of the first and second light guide plates (e.g., displays 1920 and 1930).

According to an embodiment of the disclosure, the AR device 1900 may measure a distance to a physical object located in a front direction of the AR device 1900 by using the outward camera 1913. The outward camera 1913 may include a high-resolution camera such as a high resolution (HR) camera or a photo video (PV) camera.

The AR device 1900 according to an embodiment of the disclosure is not limited to the above-described structure, and a various number of various components may be included at various locations.

Various embodiments of the disclosure may be implemented or supported by one or more computer programs, and the one or more computer programs may be formed from computer-readable program code and may be included in computer-readable media. According to the disclosure, an "application" and a "program" may represent one or more computer programs, software components, instruction sets, procedures, functions, objects, classes, instances, related data, or a portion thereof, which are suitable for implementation in computer-readable program code. "Computer-readable program code" may include various types of computer code including source code, objective code, and executable code. "Computer-readable media" may include various types of media that may be accessed by a computer, like read only memory (ROM), random access memory (RAM), a hard disk drive (HDD), a compact disk (CD), a digital video disk (DVD), and various other types of memory.

Machine-readable storage media may be provided as non-transitory storage media. The non-transitory storage media are tangible devices and may exclude wired, wireless, optical, or other communication links that transmit temporary electrical or other signals. The non-transitory storage media do not distinguish between a case in which data is semi-permanently stored in storage media and a case in which data is temporarily stored in storage media. For example, the non-transitory storage media may include a buffer in which data is temporarily stored. Computer readable media can be any available media which can be accessed by computers, and may include all volatile/non-volatile and removable/non-removable media. Computer readable media includes media in which data can be permanently stored and media in which data can be stored and later overwritten, such as rewritable optical disks or removable memory devices.

According to an embodiment of the disclosure, a method according to various disclosed embodiments may be provided by being included in a computer program product. Computer program products are commodities and thus may be traded between sellers and buyers. Computer program products may be distributed in the form of device-readable storage media (e.g., compact disc read only memory (CD-ROM)), or may be distributed (e.g., downloaded or uploaded) through an application store or between two user devices (e.g., smartphones) directly and online. In the case of online distribution, at least a portion of the computer program product (e.g., a downloadable app) may be stored at least temporarily in a device-readable storage medium, such as a memory of a manufacturer's server, a server of an application store, or a relay server, or may be temporarily generated.

While the disclosure has been particularly shown and described with reference to exemplary embodiments thereof, it will be understood that various changes in form and details may be made therein without departing from the spirit and scope of the disclosure. Thus, the above-described embodiments should be considered in descriptive sense only and not for purposes of limitation. For example, each component described as a single type may be implemented in a distributed manner, and similarly, components described as being distributed may be implemented in a combined form.

The scope of the disclosure is indicated by the scope of the claims to be described later rather than the above detailed description, and all changes or modified forms derived from the meaning and scope of the claims and the concept of equivalents thereof should be interpreted as being included in the scope of the disclosure.

What is claimed is:

1. A method of obtaining a depth map, performed by an augmented reality (AR) device comprising a motion sensor and a time-of-flight (ToF) type depth sensor, the method comprising:
   detecting, by the motion sensor, a motion of the AR device worn by a user;
   identifying an activity of the user, based on the detected motion of the AR device; and
   obtaining, by the TOF-type depth sensor, the depth map based on the identified activity,
   wherein obtaining the depth map comprises:
      determining a light pattern of emission light to be emitted by the TOF-type depth sensor based on the identified activity, wherein the light pattern of the emission light is a pattern that represents an area irradiated by the emission light on a field of view cross-section of the TOF-type depth sensor, and wherein a density of the light pattern of the emission light varies based on an amount of movement of the user corresponding to the identified activity;
      controlling the TOF-type depth sensor to emit emission light in the determined light pattern;
      detecting reflection light where the emission light is reflected by at least one object; and
      generating the depth map, based on the emission light and the detected reflection light, wherein the depth map comprises a physical distance between the TOF-type depth sensor and each of the at least one object measured based on a phase difference between the emission light and the corresponding reflection light.

2. The method of claim 1, wherein the TOF-type depth sensor comprises at least one emitter, and
   wherein the controlling the TOF-type depth sensor to emit the emission light in the determined light pattern comprises controlling an operation of the at least one emitter.

3. The method of claim 1, wherein the TOF-type depth sensor comprises a plurality of light source modules configured to emit emission light in different light patterns, and
   the controlling the TOF-type depth sensor to emit the emission light in the determined light pattern comprises individually controlling respective on and off states of each light source module of the plurality of light source modules.

4. The method of claim 1, wherein the TOF-type depth sensor comprises a varifocal lens comprising an upper electrode and microlenses, and a light emission unit configured to emit the emission light through the varifocal lens to an area in front of the AR device, and
   wherein the controlling of the TOF-type depth sensor to emit the emission light in the determined light pattern comprises controlling whether a voltage is applied to the upper electrode and an intensity of the voltage applied to the upper electrode so that an arrangement of the microlenses changes to change a path of the emission light emitted through the varifocal lens.

5. The method of claim 4, wherein the light emission unit comprises a plurality of emitters arranged in a grid array, and
   wherein the controlling the TOF-type depth sensor to emit the emission light in the determined light pattern further comprises controlling an operation of the plurality of emitters.

6. The method of claim 1, wherein the TOF-type depth sensor comprises a light emission unit, and a liquid crystal mirror (LCM) configured to control a direction of light emitted by the light emission unit,
   wherein the emission light emitted by the TOF-type depth sensor is emitted by the light emission unit, reflected by the LCM, and emitted toward an area in front of the AR device, and
   wherein the controlling the TOF-type depth sensor to emit the emission light in the determined light pattern comprises controlling the LCM.

7. The method of claim 1, further comprising:
   determining an intensity of the emission light to be emitted by the TOF-type depth sensor and a sensing frame rate of the TOF-type depth sensor based on the amount of movement of the user corresponding to the identified activity, wherein the sensing frame rate is a frame rate of the TOF-type depth sensor measuring a depth value; and
   controlling the TOF-type depth sensor to emit the emission light with the determined intensity at the determined sensing frame rate.

8. The method of claim 1, further comprising:
   obtaining, by an illuminance sensor, brightness information of surrounding environment of the AR device worn by the user;
   identifying a location of the AR device, based on the brightness information of the AR device;
   adjusting the light pattern of the emission light to be emitted by the TOF-type depth sensor, based on the location of the AR device; and
   controlling the TOF-type depth sensor to emit the emission light with the adjusted light pattern.

9. The method of claim 1, further comprising:
obtaining, by an image sensor, a two-dimensional (2D) image of an area in front of the AR device; and
generating a compensated depth map comprising depth information for all pixels based on the depth map generated through the TOF-type depth sensor by emitting the emission light having the determined light pattern and the 2D image obtained by the image sensor.

10. An augmented reality (AR) device comprising:
a motion sensor configured to detect a motion of the AR device worn by a user;
a time-of-flight (ToF) type depth sensor comprising a light emission unit and a light detection unit;
a storage storing at least one instruction; and
at least one processor configured to execute the at least one instruction to:
identify an activity of the user, based on the motion of the AR device detected by the motion sensor, and
obtain, through the TOF-type depth sensor, a depth map based on the identified activity,
wherein the at least one processor is configured to execute the at least one instruction to obtain the depth map by:
determining a light pattern of emission light to be emitted by the TOF-type depth sensor based on the identified activity, wherein the light pattern of the emission light is a pattern that represents an area irradiated by the emission light on a field of view cross-section of the TOF-type depth sensor, and wherein a density of the light pattern of the emission light varies based on an amount of movement of the user corresponding to the identified activity,
controlling the light emission unit to emit the emission light in the determined light pattern,
detecting, through the light detection unit, reflection light where the emission light is reflected by at least one object, and
generating the depth map based on the emission light and the detected reflection light, wherein the depth map comprises a physical distance between the TOF-type depth sensor and each of the at least one object measured based on a phase difference between the emission light and the corresponding reflection light.

11. The AR device of claim 10, wherein the light emission unit comprises at least one emitter or a plurality of light source modules configured to emit emission light in different light patterns, and
wherein the at least one processor is further configured to execute the at least one instruction to control an operation of the at least one emitter or to individually control respective on states and off states of each light source module of the plurality of light source modules.

12. The AR device of claim 10, wherein the TOF-type depth sensor further comprises a varifocal lens comprising an upper electrode and microlenses,
wherein the emission light emitted by the TOF-type depth sensor is emitted from the light emission unit to an area in front of the AR device through the varifocal lens, and
wherein the at least one processor is further configured to execute the at least one instruction to control whether a voltage is applied to the upper electrode and an intensity of the voltage applied to the upper electrode so that an arrangement of the microlenses changes to change a path of the emission light emitted through the varifocal lens.

13. The AR device of claim 10, wherein the TOF-type depth sensor further comprises a liquid crystal mirror (LCM) configured to control a direction of light emitted by the light emission unit,
wherein the emission light emitted by the TOF-type depth sensor is emitted by the light emission unit, reflected by the LCM, and emitted toward an area in front of the AR device, and
wherein the at least one processor is further configured to execute the at least one instruction to control the LCM.

14. The AR device of claim 10, further comprising an illuminance sensor configured to obtain brightness information of surrounding environment of the AR device,
wherein the at least one processor is further configured to execute the at least one instruction to:
identify a location of the AR device, based on the brightness information of the AR device obtained by the illuminance sensor,
adjust the light pattern of the emission light to be emitted by the TOF-type depth sensor, based on the identified location, and
control the TOF-type depth sensor to emit the emission light with the adjusted light pattern.

15. The AR device of claim 10, further comprising an image sensor configured to obtain a two-dimensional (2D) image of an area in front of the AR device,
wherein the at least one processor is further configured to execute the at least one instruction to generate a compensated depth map comprising depth information for all pixels based on the depth map generated through the TOF-type depth sensor by emitting the emission light having the determined light pattern and the 2D image obtained by the image sensor.

* * * * *